United States Patent
Harrison et al.

(10) Patent No.: US 10,215,989 B2
(45) Date of Patent: Feb. 26, 2019

(54) SYSTEM, METHOD AND COMPUTER PROGRAM PRODUCT FOR REAL-TIME ALIGNMENT OF AN AUGMENTED REALITY DEVICE

(71) Applicant: Lockheed Martin Corporation, Bethesda, MD (US)

(72) Inventors: Gregory A. Harrison, Oviedo, FL (US); David A. Smith, Cary, NC (US); Jason M. Black, Orlando, FL (US); Ehsan Ghaneie, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 120 days.

(21) Appl. No.: 15/097,074

(22) Filed: Apr. 12, 2016

(65) Prior Publication Data

US 2016/0223822 A1 Aug. 4, 2016

Related U.S. Application Data

(63) Continuation of application No. 13/720,248, filed on Dec. 19, 2012.

(51) Int. Cl.
  *G02B 27/01* (2006.01)
  *G06F 3/01* (2006.01)
  (Continued)

(52) U.S. Cl.
  CPC ......... *G02B 27/0176* (2013.01); *G01C 21/16* (2013.01); *G01C 25/005* (2013.01);
  (Continued)

(58) Field of Classification Search
  None
  See application file for complete search history.

(56) References Cited

U.S. PATENT DOCUMENTS 5,010,323 A 4/1991 Hoffman
5,373,857 A 12/1994 Travers et al.
(Continued)

FOREIGN PATENT DOCUMENTS

| TW | 201228380 A | 7/2012 |
|---|---|---|
| WO | 03060830 A1 | 7/2003 |
| WO | 2008104988 A2 | 9/2008 |

OTHER PUBLICATIONS

Examiner's Answer for U.S. Appl. No. 13/841,608, dated Sep. 19, 2016, 8 pages.
(Continued)

*Primary Examiner* — Yingchun He
(74) *Attorney, Agent, or Firm* — Withrow & Terranova, PLLC

(57) ABSTRACT

A system including a structure attachable to a surface in a real world environment, the structure establishing a known location and orientation of the structure, a docking element, as part of the structure, to secure an augmented reality device in a stationary position for alignment of the augmented reality device with the real world environment and with a parallel virtual environment, and a processor operable to perform the alignment by resetting the inertial navigation system of the augmented reality device to the known location when docked in the docking element and aligning the location and orientation of the virtual representation of the augmented reality device in the parallel virtual environment so that the parallel virtual environment in the augmented reality device overlaps the real world environment. A method and computer software produce are also disclosed.

16 Claims, 7 Drawing Sheets

(51) Int. Cl.
  *G06K 9/32* (2006.01)
  *G06T 19/00* (2011.01)
  *G09G 5/377* (2006.01)
  *G01S 19/40* (2010.01)
  *G01C 21/16* (2006.01)
  *G01C 25/00* (2006.01)
  *G06F 1/16* (2006.01)

(52) U.S. Cl.
  CPC ............ *G01S 19/40* (2013.01); *G02B 27/017* (2013.01); *G02B 27/0179* (2013.01); *G06F 1/163* (2013.01); *G06F 3/011* (2013.01); *G06F 3/012* (2013.01); *G06K 9/3208* (2013.01); *G06T 19/003* (2013.01); *G06T 19/006* (2013.01); *G09G 5/377* (2013.01); *G02B 2027/014* (2013.01); *G02B 2027/0187* (2013.01); *G02B 2027/0198* (2013.01)

(56) References Cited

U.S. PATENT DOCUMENTS

| | | | |
|---|---|---|---|
| 5,594,707 | A | 1/1997 | Goto et al. |
| 5,991,085 | A | 11/1999 | Rallison et al. |
| 6,445,815 | B1 | 9/2002 | Sato |
| 6,500,008 | B1 | 12/2002 | Ebersole et al. |
| 6,753,828 | B2 | 6/2004 | Tuceryan et al. |
| 6,768,701 | B1 | 7/2004 | Cummings et al. |
| 6,856,324 | B2 | 2/2005 | Sauer et al. |
| 7,176,936 | B2 | 2/2007 | Sauer et al. |
| 7,190,331 | B2 | 3/2007 | Genc et al. |
| 7,239,330 | B2 | 7/2007 | Sauer et al. |
| 7,242,766 | B1 | 7/2007 | Lyle |
| 7,369,101 | B2 | 5/2008 | Sauer et al. |
| 7,626,569 | B2 | 12/2009 | Lanier |
| 8,264,494 | B2 | 9/2012 | Kilani et al. |
| 8,401,225 | B2 | 3/2013 | Newcombe et al. |
| 8,553,037 | B2 | 10/2013 | Smith et al. |
| 8,576,143 | B1 | 11/2013 | Kelly |
| 8,768,855 | B2 | 7/2014 | Budlong |
| RE45,062 | E * | 8/2014 | Maguire, Jr. ............ G06F 3/011 345/8 |
| 8,957,948 | B2 | 2/2015 | Ernst et al. |
| 8,963,999 | B1 | 2/2015 | Mercay et al. |
| 9,218,665 | B2 | 12/2015 | Meier |
| 2001/0029582 | A1 | 10/2001 | Goodman et al. |
| 2002/0044104 | A1 | 4/2002 | Friedrich et al. |
| 2002/0078343 | A1 | 6/2002 | Rubin et al. |
| 2002/0095265 | A1 | 7/2002 | Satoh et al. |
| 2002/0105484 | A1 | 8/2002 | Navab et al. |
| 2002/0113756 | A1 | 8/2002 | Tuceryan et al. |
| 2002/0167536 | A1 | 11/2002 | Valdes et al. |
| 2004/0107072 | A1 | 6/2004 | Dietrich et al. |
| 2004/0130614 | A1 | 7/2004 | Valliath et al. |
| 2006/0152434 | A1 | 7/2006 | Sauer et al. |
| 2007/0049374 | A1 * | 3/2007 | Ikeda ...................... A63F 13/06 463/30 |
| 2007/0064098 | A1 | 3/2007 | Tran |
| 2007/0069977 | A1 | 3/2007 | Adderton |
| 2007/0273644 | A1 | 11/2007 | Mondine Natucci |
| 2008/0259096 | A1 | 10/2008 | Huston |
| 2009/0033588 | A1 | 2/2009 | Kajita et al. |
| 2009/0293012 | A1 | 11/2009 | Alter et al. |
| 2010/0033484 | A1 | 2/2010 | Kim et al. |
| 2010/0039377 | A1 | 2/2010 | Lewis et al. |
| 2010/0096491 | A1 | 4/2010 | Whitelaw et al. |
| 2010/0149073 | A1 | 6/2010 | Chaum et al. |
| 2010/0164990 | A1 | 7/2010 | Van Doorn |
| 2010/0238161 | A1 | 9/2010 | Varga et al. |
| 2010/0241847 | A1 | 9/2010 | van der Horst et al. |
| 2010/0302233 | A1 | 12/2010 | Holland |
| 2011/0090253 | A1 | 4/2011 | Good |
| 2011/0115816 | A1 | 5/2011 | Brackney |
| 2011/0137561 | A1 | 6/2011 | Kankainen |
| 2011/0157357 | A1 | 6/2011 | Weisensale et al. |
| 2011/0173576 | A1 | 7/2011 | Murphy et al. |
| 2011/0199479 | A1 | 8/2011 | Waldman |
| 2011/0213664 | A1 | 9/2011 | Osterhout et al. |
| 2011/0234631 | A1 | 9/2011 | Kim et al. |
| 2011/0238079 | A1 | 9/2011 | Hannaford et al. |
| 2011/0249453 | A1 | 10/2011 | Okitsu |
| 2011/0264922 | A1 | 10/2011 | Beaumont et al. |
| 2011/0279445 | A1 | 11/2011 | Murphy et al. |
| 2012/0010812 | A1 | 1/2012 | Thompson |
| 2012/0092372 | A1 | 4/2012 | Ryu et al. |
| 2012/0092373 | A1 | 4/2012 | Ryu et al. |
| 2012/0148106 | A1 | 6/2012 | Sung et al. |
| 2012/0155382 | A1 | 6/2012 | Grzechnik et al. |
| 2012/0194418 | A1 | 8/2012 | Osterhout et al. |
| 2012/0203487 | A1 | 8/2012 | Johnson et al. |
| 2012/0218301 | A1 | 8/2012 | Miller |
| 2012/0242696 | A1 | 9/2012 | Martin |
| 2012/0257797 | A1 | 10/2012 | Leyvand et al. |
| 2012/0264510 | A1 | 10/2012 | Wigdor et al. |
| 2012/0274808 | A1 | 11/2012 | Chong et al. |
| 2012/0293325 | A1 | 11/2012 | Lahcanski et al. |
| 2012/0302289 | A1 | 11/2012 | Kang |
| 2012/0330646 | A1 | 12/2012 | Andrade et al. |
| 2013/0009993 | A1 | 1/2013 | Horseman |
| 2013/0010103 | A1 | 1/2013 | Ihara et al. |
| 2013/0031202 | A1 | 1/2013 | Mick et al. |
| 2013/0036371 | A1 | 2/2013 | Cohen |
| 2013/0042296 | A1 | 2/2013 | Hastings et al. |
| 2013/0050260 | A1 | 2/2013 | Reitan |
| 2013/0050262 | A1 | 2/2013 | Jeon |
| 2013/0073374 | A1 | 3/2013 | Heath |
| 2013/0083003 | A1 | 4/2013 | Perez et al. |
| 2013/0083062 | A1 | 4/2013 | Geisner et al. |
| 2013/0103608 | A1 | 4/2013 | Scipioni et al. |
| 2013/0141421 | A1 | 6/2013 | Mount et al. |
| 2013/0148803 | A1 | 6/2013 | Jho et al. |
| 2013/0159330 | A1 | 6/2013 | Smith |
| 2013/0179576 | A1 | 7/2013 | Boldyrev et al. |
| 2013/0262864 | A1 | 10/2013 | Hamid |
| 2013/0269013 | A1 | 10/2013 | Parry et al. |
| 2013/0271488 | A1 | 10/2013 | Stirbu et al. |
| 2013/0272523 | A1 | 10/2013 | McCorkindale et al. |
| 2013/0287210 | A1 | 10/2013 | Matsuda et al. |
| 2013/0297378 | A1 | 11/2013 | Hong |
| 2013/0339864 | A1 | 12/2013 | Uusitalo et al. |
| 2014/0063055 | A1 | 3/2014 | Osterhout et al. |
| 2014/0176661 | A1 | 6/2014 | Smurro et al. |
| 2014/0204119 | A1 | 7/2014 | Malamud et al. |

OTHER PUBLICATIONS

Examiner's Answer for U.S. Appl. No. 13/841,451, dated Dec. 16, 2016, 14 pages.

Author Unknown, "Xtion PRO: Use Xtion PRO developer solution to make motion-sensing applications and games," Product Overview, ASUSTeK Computer Inc., retrieved Nov. 14, 2014 from http://www.asus.com/Multimedia/Xtion_PRO/, 6 pages.

Bichlmeier, C. et al., "The Virtual Mirror: A New Interaction Paradigm for Augmented Reality Environments," IEEE Transactions on Medical Imaging, vol. 28, Issue 9, Sep. 2009, pp. 1498-1510.

Kancherla, A. et al., "Calibrating See-Through Head-Mounted Displays," TR95-034, Jan. 1996, Department of Computer Science, University of North Carolina at Chapel Hill, 28 pages.

Palmer, D. et al., "Annotating with Light for Remote Guidance," Proceedings of the 19th Australasian Conference on Computer—Human Interaction: Entertaining User Interfaces, Nov. 2007, ACM, pp. 103-110.

Perez-Marcos, D. et al., "A fully immersive set-up for remote interaction and neurorehabilitation based on virtual body ownership," Frontiers in Neurology, vol. 3, Article 110, Jul. 10, 2012, 9 pages.

Pirovano, M., "Kinfu—an open source implementation of Kinect Fusion + case study: implementing a 3D scanner with PCL," Project Assignment, 3D structure from visual motion, 2011/2012, University of Milan, http://homes.di.unimi.it/~pirovano/pdf/3d-scanning-pcl.pdf, 20 pages.

(56) References Cited

OTHER PUBLICATIONS

Satoh, K. et al., "A Hybrid Registration Method for Outdoor Augmented Reality," Proceedings of the IEEE and ACM International Symposium on Augmented Reality, Oct. 29-30, 2001, IEEE Computer Society, pp. 67-76.
Zhu, L. et al., "A Real-time Deformation Modeling Scheme of Soft Tissue for Virtual Surgical," Proceedings of the 2010 IEEE International Conference on Information and Automation, Jun. 20-23, 2010, Harbin, China, IEEE, pp. 771-775.
International Search Report and Written Opinion for PCT/US2013/075966, dated Apr. 14, 2014, 14 pages.
Office Action of the Intellectual Property Office for Taiwanese Patent Application No. 102147293, dated Mar. 25, 2015, 13 pages.
Non-Final Office Action for U.S. Appl. No. 13/720,248, dated Dec. 24, 2014, 20 pages.
Final Office Action for U.S. Appl. No. 13/720,248, dated May 14, 2015, 31 pages.
Non-Final Office Action for U.S. Appl. No. 13/827,334, dated Jun. 18, 2015, 12 pages.
Non-Final Office Action for U.S. Appl. No. 13/841,451, dated Apr. 7, 2015, 14 pages.
Non-Final Office Action for U.S. Appl. No. 13/841,608, dated Mar. 20, 2015, 14 pages.
Non-Final Office Action for U.S. Appl. No. 13/841,750, dated Aug. 14, 2014, 12 pages.
International Preliminary Report on Patentability for PCT/US2013/075966 dated Jul. 2, 2015, 9 pages.
Non-Final Office Action for U.S. Appl. No. 13/720,248, dated Sep. 10, 2015, 31 pages.
Final Office Action for U.S. Appl. No. 13/841,608, dated Aug. 12, 2015, 11 pages.
Final Office Action for U.S. Appl. No. 13/841,898, dated Aug. 7, 2015, 9 pages.
Final Office Action for U.S. Appl. No. 13/842,082, dated Sep. 11, 2015, 20 pages.
Author Unknown, "C-Series Display Reference Manual," Raymarine UK, Mar. 2006, 244 pages.
Haydar, M. et al., "Virtual and augmented reality for cultural computing and heritage: a case study of virtual exploration of underwater archaeological sites (preprint)," Virtual Reality, vol. 15, Issue 4, Nov. 2011, Springer, pp. 311-327.
Kirner, C. et al., "A Data Visualization Virtual Environment Supported by Augmented Reality," 2006 IEEE International Conference on Systems, Man, and Cybernetics, Oct. 8-11, 2006, Taipei, Taiwan, IEEE, 6 pages.
Final Office Action for U.S. Appl. No. 13/720,248, dated Jan. 12, 2016, 35 pages.
Final Office Action for U.S. Appl. No. 13/827,334, dated Dec. 1, 2015, 14 pages.
Advisory Action for U.S. Appl. No. 13/827,334, dated Feb. 19, 2016, 5 pages.
Non-Final Office Action for U.S. Appl. No. 13/839,668, dated Mar. 18, 2015, 11 pages.
Final Office Action for U.S. Appl. No. 13/839,668, dated Aug. 7, 2015, 14 pages.
Non-Final Office Action for U.S. Appl. No. 13/839,668, dated Nov. 18, 2015, 18 pages.
Final Office Action for U.S. Appl. No. 13/839,668, dated Apr. 15, 2016, 21 pages.
Final Office Action for U.S. Appl. No. 13/841,451, dated Oct. 15, 2015, 26 pages.
Advisory Action for U.S. Appl. No. 13/841,451, dated Jan. 25, 2016, 4 pages.
Advisory Action for U.S. Appl. No. 13/841,608, dated Oct. 23, 2015, 2 pages.
Final Office Action for U.S. Appl. No. 13/841,068, dated Jan. 7, 2016, 11 pages.
Non-Final Office Action for U.S. Appl. No. 13/841,898, dated Mar. 11, 2015, 13 pages.
Advisory Action for U.S. Appl. No. 13/841,898, dated Oct. 19, 2015, 2 pages.
Non-Final Office Action for U.S. Appl. No. 13/842,082, dated Feb. 2, 2015, 17 pages.
Decision on Appeal for U.S. Appl. No. 13/841,608, dated Aug. 2, 2017, 10 pages.
Decision on Appeal for U.S. Appl. No. 13/841,451, dated Mar. 29, 2018, 17 pages.

* cited by examiner

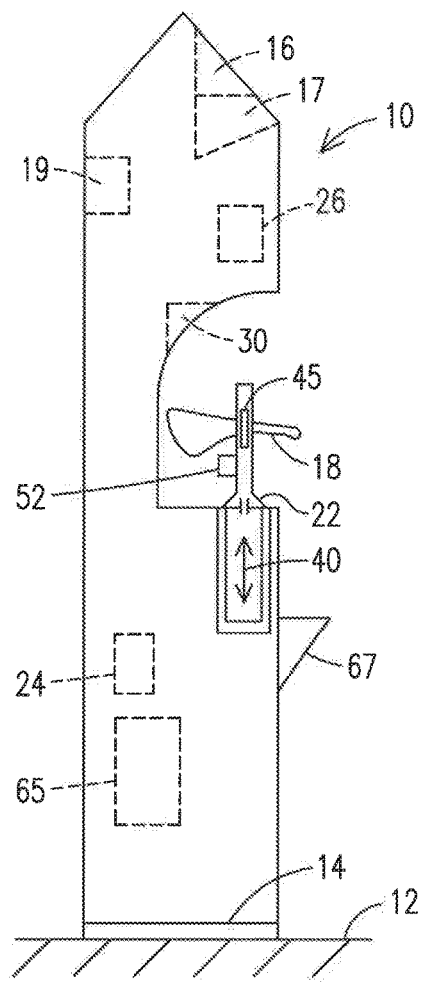
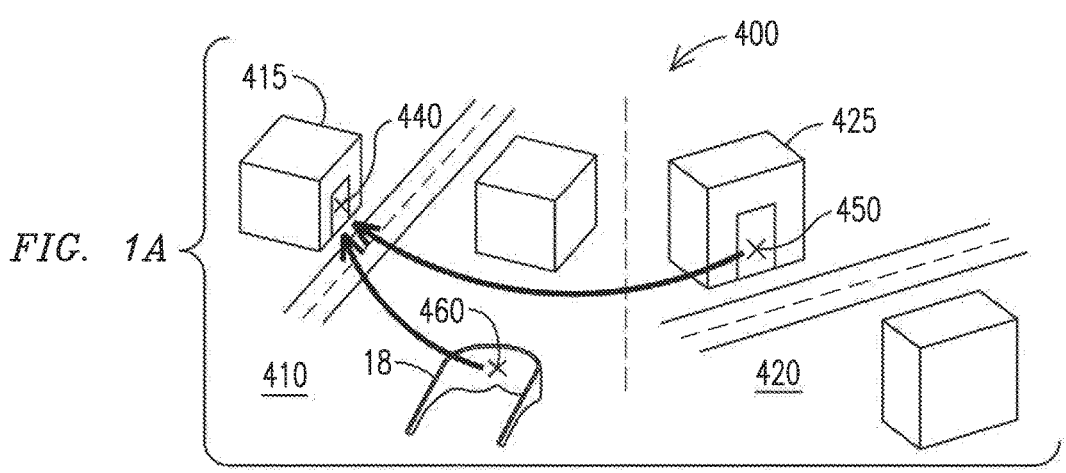
FIG. 1
FIG. 1A

SYSTEM, METHOD AND COMPUTER PROGRAM PRODUCT FOR REAL-TIME ALIGNMENT OF AN AUGMENTED REALITY DEVICE

RELATED APPLICATION

This patent application is a continuation of co-pending U.S. patent application Ser. No. 13/720,248, filed on Dec. 19, 2012, entitled "SYSTEM, METHOD AND COMPUTER PROGRAM PRODUCT FOR REAL-TIME ALIGNMENT OF AN AUGMENTED REALITY DEVICE," which is hereby incorporated herein by reference in its entirety.

BACKGROUND

Embodiments relate to aligning an inertial navigation system with a real-world environment and a parallel virtual-world environment. Motion calibration of the inertial navigation system of a head mounted display within these environments is also provided.

A head-mounted display, such as a helmet-mounted display or eyeglass-mounted display (abbreviated herein as an "HMD" and "HMDs" when referring to a plurality) is a display device worn on the head of an individual that has one or more small display devices located near one eye or, more commonly, both eyes of the individual, user, or wearer. HMDs may be monocular (where one eye has a view screen), biocular (where both eyes see the same scene on the same screen), or binocular (where each eye has an individual view screen).

Some HMDs display only simulated (computer-generated) images, as opposed to real-world images and, accordingly are often referred to as "virtual reality" or immersive HMDs. Other HMDs superimpose (combine) a simulated image upon a non-simulated, real-world image. The combination of non-simulated and simulated images allows the HMD user to view the world through, by way of non-limiting example, a visor or eyepiece on which additional data relevant to the task to be performed may be superimposed onto the forward field of view (FOV) of the user. This superposition is sometimes referred to as "augmented reality" or "mixed reality."

Combining a non-simulated, real-world view with a simulated image can be achieved using a partially-reflective/partially-transmissive optical surface (a "beam splitter") where the surface's reflectivity may be used to display the simulated image as a virtual image (in the optical sense) and the surface's transmissivity may be used to allow the user to view the real world directly (referred to as an "optical see-through system"). Combining a real-world view with a simulated image can also be done electronically by accepting video of a real world view from a camera and mixing it electronically with a simulated image using a combiner (referred to as a "video see-through system"). The combined image can then be presented to the user as a virtual image (in the optical sense) by means of a reflective optical surface, which in this case need not have transmissive properties.

As a part of the HMD, an inertial navigation system ("INS"), or sometimes referenced as an inertial measurement unit ("IMU"), may be included to provide detailed, accurate position and orientation information. The inertial navigation system usually possesses rapid processing capabilities while requiring a minimum amount of power. Furthermore, the INS does not typically require constant satellite visibility because internal components such as, but not limited to, at least one gyroscope and at least one accelerometer (or other motion-sensing devices) in communication with a processor, are used to continuously calculate position, orientation, and velocity (including direction and speed of movement).

The INS of the HMD usually gets its velocity calibration from another source such as, but not limited to, a human operator, pre-set factory (or laboratory) specifications, a satellite receiver, etc. Whereas location information has to be provided by a human operator or other means when the HMD is powered up. By way of non-limiting example, when the HMD is turned on, or powered up, information may be entered regarding where the HMD is located and its orientation, such as through a graphic user interface connected to a computer which processes INS data. Whereas, when the HMD is turned off it may not update and integrate its current location, and thus needs to be told where it is and in what direction it is pointing when it is turned on again. Henceforth, the accelerometers and gyroscope information provide rates of change of position or orientation, and these rates must be integrated, with the given initial condition specified in order to estimate the current position and orientation of the HMD.

However, the gyroscopes can drift and the accelerometer can lose accuracy, resulting in errors with respect to position, velocity, and orientation. Though the errors may at first be small, depending on the use of the HMD, such errors could have significant consequences. Furthermore, the errors may expand over time. Thus the INS may require periodic aligning, refreshing, and/or updating with accurate location and orientation information.

Furthermore, each user has a unique view through the HMD due to each user's inter-pupillary distance and the depth of eyes in each user's head. Additionally, the height of the user may also affect the user's ability to properly register to an external environment viewable through the HMD. If multiple users utilize the same HMD, the device may only be calibrated for one of the users, thus making the HMD not effective for the other users.

Currently, most updating of the inertial navigation system of the HMD is accomplished in a laboratory, or a sterile facility. Ample tools and equipment are available at such locations to a user to calibrate the inertial navigation system of the HMD and to adjust the HMD to best accommodate a particular user. However, the same is not true when an HMD is being used away from the sterile facility, more specifically when the HMD is being used in the field, or in an operational setting. When in the operational setting, as an error may occur and possibly expand, or multiple users may need to use the HMD, but without an ability to align, refresh or adjust the HMD in real-time, the user may simply cease using the HMD. Thus, manufacturers and users of HMDs would benefit from being able to perform real-time alignments, refreshments and/or adjustments of the HMD when the HMD is being used in an operational setting.

BRIEF DESCRIPTION

Embodiments relate to a system, method, and computer software code for alignment of an augmented reality inertial navigation system. An embodiment of the system may comprise a structure attachable to a surface in a real world environment, the structure establishing a known location and orientation of the structure, and a docking element, as part of the structure, to secure an augmented reality device in a stationary position for alignment of the augmented reality device with the real world environment and with a parallel virtual environment. The system may also comprise a processor operable to perform the alignment by resetting the inertial navigation system of the augmented reality device to the known location when docked in the docking element and aligning the location and orientation of the virtual representation of the augmented reality device in the parallel virtual environment so that the parallel virtual environment in the augmented reality device overlaps the real world environment.

An embodiment of the method may comprise establishing a known location and orientation of a calibration location post having a docking element, and providing an augmented reality device with the known location and orientation when docked in the docking element. The method may also comprise calibrating the augmented reality device to align a virtual environment with the real world environment of the augmented reality device with respect to a current location and orientation of the post.

The computer software code is a part of a non-transitory processor readable storage medium, providing an executable computer program product, the executable computer program product may comprise a computer software code that, when executed on a processor, initiate acquisition of information comprising a current location and/or orientation of an electronic calibration and/or location post, and detect when an augmented reality device is attached to the post. The computer software code may further, when executed on a processor, calibrate the augmented reality device to align a virtual environment with a real world environment of the augmented reality device with respect to a current location and/or orientation of the post.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which:

FIG. 1 shows an embodiment of a location post in accordance with an embodiment;

FIG. 1a shows an example of an HMD alignment with a real world environment simultaneously with a parallel virtual world environment in accordance with an embodiment;

DETAILED DESCRIPTION

Figure 3:
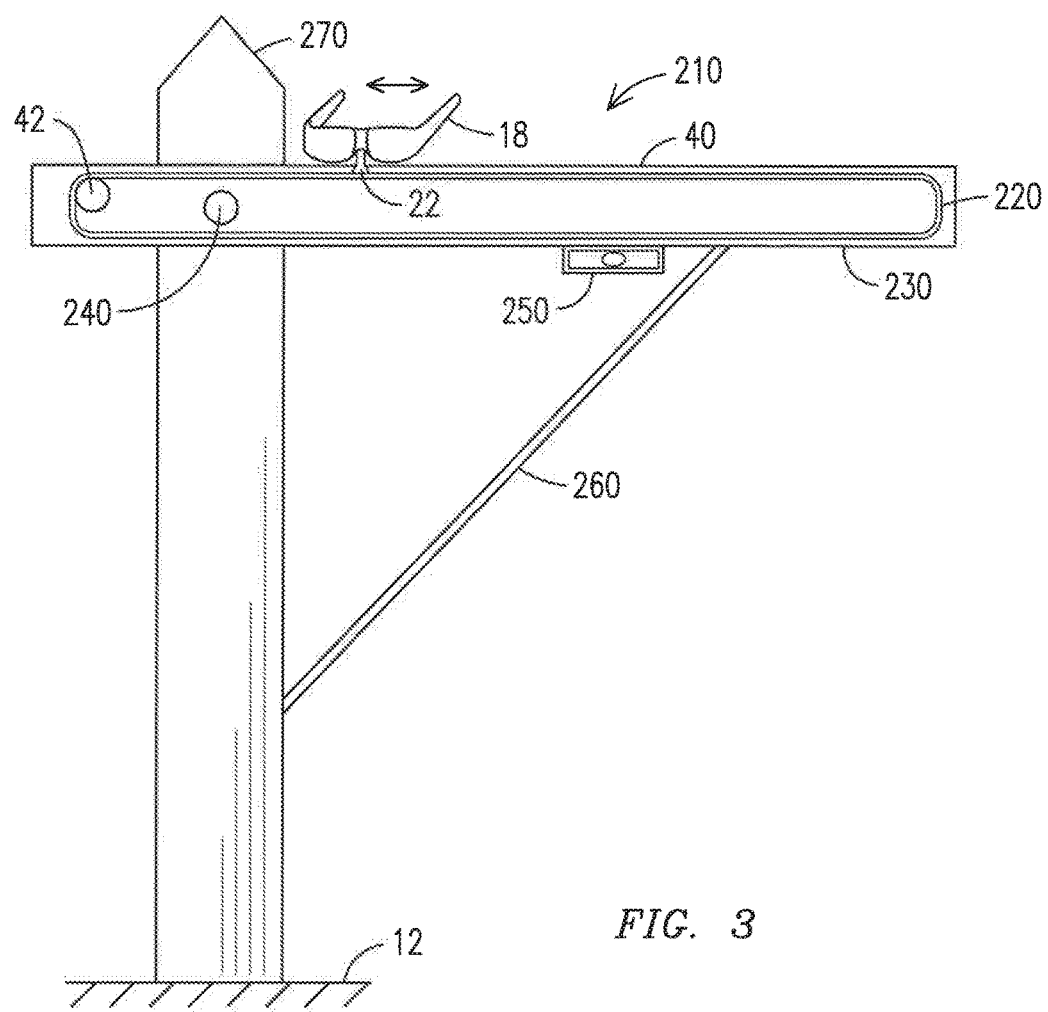
FIG. 3 shows the an advanced electronic post with a horizontal linear motion calibration system in accordance with an embodiment.

Reference will be made below in detail to embodiments which are illustrated in the accompanying drawings. Wherever possible, the same reference numerals used throughout the drawings refer to the same or like parts. Broadly speaking, a technical effect may be to align an augmented reality inertial navigation system for both a single user and multiple users of a single head-mounted device or display ("HMD"). To facilitate an understanding of embodiments, reference to specific implementations thereof is provided herein.

Throughout this specification the terms "align," "refresh," "calibrate" and/or "update," including verbs of these terms, may be utilized interchangeably. Each term is associated with correcting an error that may have developed with an inertial navigation system ("INS") of the HMD or establishing a location of the HMD. The INS may also be referred to as an inertial measurement unit. The intent of the INS may be a navigation aid that uses a processor, motion sensors (namely at least one accelerometer), and rotation sensors (namely at least one gyroscope). Whereas the term "adjust" may be used with respect to changing or correcting a physical feature on the HMD; however, it may also be used with respect to the above discussed terms. The term "adjust" primarily may be considered to consist of an electronic adjustment internal to the augmented reality device, such that it applies correction data to the current location and orientation information that the AR device is representing internal as the AR device location and orientation. Other internal AR Device electronic adjustments include shifting the image left, right, up, or down in order to align the internal virtual environment imagery that the user is presented with to each eye such that it matches calibration imagery that exists in the real world, and that it is aligned to adjust to the positioning of the user's eyes. Another internal AR device electronic adjustment is that of changing the rates and internally expected directions of motion with respect to linear and rotational velocities and accelerations, when the AR device is calibrated using the motor-driven linear and rotation calibration devices.

In an embodiment, the location post may be passive where the post may contain no electronics, and configured to provide an ID number and a dock for the HMD. When placed in the dock, the HMD may automatically perform an internal calibration, resetting all offsets to location and rotation to zero, and using the current location and orientation of the location post to which the HMD is physical placed as the new initial condition for subsequent estimation of the location and orientation through the use of the INS.

In an embodiment, the location post is an electronic post where the location post provides a digital communication system to communicate location and orientation information to the attached HMD. In an embodiment, the electronic post may provide additional information such as user biometric calibration data stored on the post or in a remote location. After the biometric calibration data is provided, then the HMD may perform the same reset of the INS offsets and accept the current location and orientation as the starting point for subsequent location estimation based upon INS processing.

In an embodiment, the location post may be an INS-calibrating electronic post. In this embodiment, the INS-calibrating electronic post includes motor-driven calibration capabilities that allow the translational and rotational velocity and acceleration sensor calibration to be aligned and adjusted.

In an embodiment, the location post may be built into a building. The post may be part of a permanent fixture, and not intended to be transitory or moveable. The location and orientation of the location post may have been determined by a surveyor team, and this information may be programmed into the post, printed on it, or stored in a remote database for network access to the user of the post. In this manner, the post may be provided as a public service by businesses in a shopping center to facilitate the use of augmented reality devices in the area by allowing the user to calibrate their own augmented reality devices as they enter the area. These permanent location posts can be placed in a building in the same manner that Automated Teller Machines are provided. They may be permanently calibrated and installed at military training sites where users can calibrate their AR devices with respect to the location, and/or recalibrate the AR device periodically due to the drift that occurs in the INS.

Though embodiments are disclosed herein with reference to the HMD, the embodiments are applicable with other devices. As a non-limiting example, the embodiments may be utilized with other augmented reality implements or devices. Thus the descriptions regarding the embodiments provided herein which specifically discuss being used with an HMD shall not be considered limiting as the term augmented reality device may be used in place of HMD.

Referring now to the drawings, embodiments will be described. Embodiments can be implemented in numerous ways, including as a system (including a computer processing system), a method (including a computerized method), an apparatus, and/or with a non-transitory processor readable storage medium. Several embodiments are discussed below.

Figure 6:
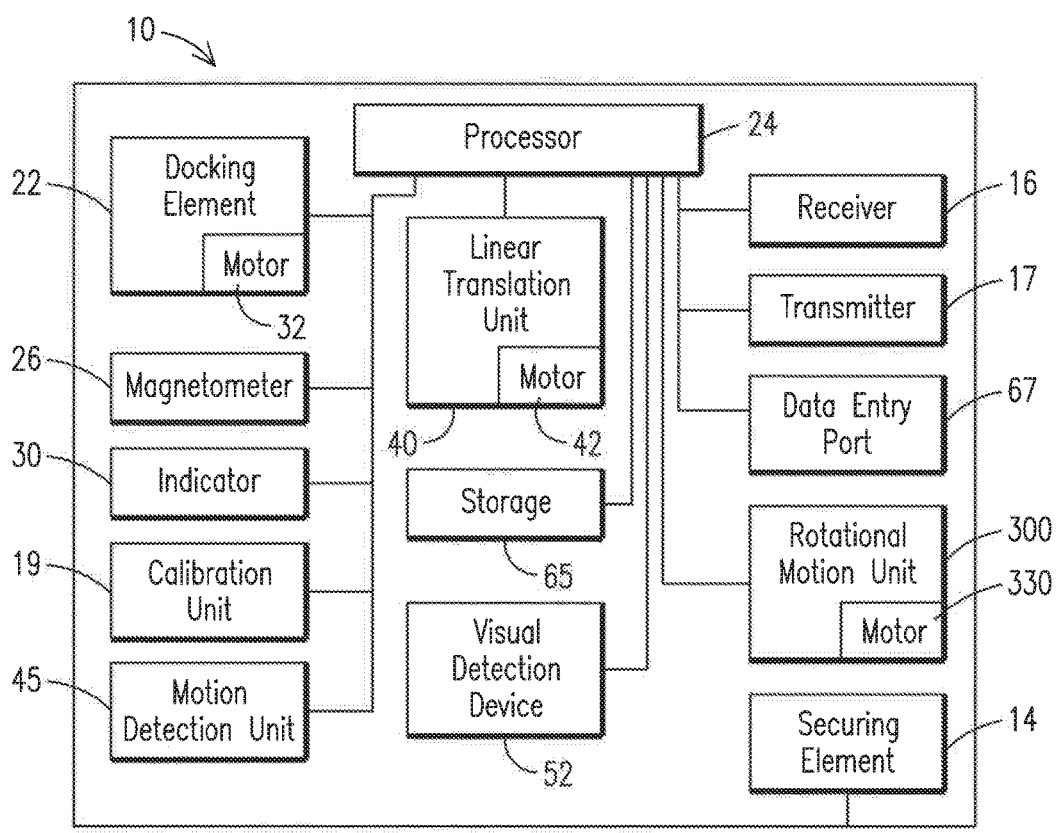
FIG. 6 shows a block diagram illustrating the electronic post in accordance with an embodiment.

FIG. 1 shows an embodiment of a location post. In the embodiment of FIG. 1, the location post is an electronic post. FIG. 6 shows a block diagram illustrating the electronic post. The electronic post will be described in relation to FIGS. 1 and 6. The electronic post 10 may be a self-contained unit. The electronic post 10 may be secured to a support surface 12 at a specific location which will result in the electronic post 10 remaining stabilized (immobilized) during an alignment process. The specific location may be a plurality of places including, but not limited to, a vehicle (such as to a roof of a ground transportation vehicle), location upon the ground, and/or any other location which is remote from a laboratory or facility where an HMD 18 is manufactured and is able to provide the electronic post 10 stationary and/or stabilized placement. The electronic post 10 may comprise a securing element 14, or device, as illustrated in FIG. 6, to connect the electronic post 10 to the support surface 12 at a location. In an embodiment, the securing element 14 may provide a temporary connection or a permanent connection to a vehicle, such as a hood or roof of the vehicle.

In an embodiment, a permanent attachment to a building or location also may be used and this would allow the post to be calibrated once. In an embodiment where the electronic post is attached to vehicle, the electronic post may require recalibration after the vehicle moves to avoid miscalibrations that may arise from vehicle motion.

To provide the temporary connection, the securing element 14 may comprise a magnet or another easily removable connector. When connecting the electronic post 10 to the ground, the securing element 14 may comprise a tripod support stand or another support having a pointed end, or insertion element, which may be inserted into the ground. By using the securing element 14 temporarily, the electronic post 10 may be easily moved from one location to another.

The electronic post 10 may further comprise the processor 24 which controls many of the other elements that make up the electronic post 10. The processor 24 may be used to activate the docking element 22 while also delivering information to the docking element 22, which in turn provides the information to the HMD 18. The docking element 22 may be motorized, hence a motor 32 is provided. Information from the HMD 18 may also be delivered from the HMD 18, through the docking element 22 to the processor 24. Likewise, the processor 24 may be used to activate the linear translation unit 40, and transmit information and receive information from the HMD 18 by way of the linear translation unit 40, and may also be used to activate the rotational motion unit 300 (FIG. 12A) and rotational unit motor 330 (FIG. 12A) and transmit information and receive information from the HMD by way of the rotational motion unit 300.

The post may include a magnetometer 26. Information may be provided to and from the magnetometer 26, by way of communications with the processor 24 (such as, but not limited to, magnetic declination data) where information from the magnetometer, or from memory storage 65, or remote storage, if the magnetic declination has already been determined, may eventually be provided to the magnetometer 28 of the HMD 18.

The electronic post 10 may include a data storage device 65 which is also in communication with the processor 24. The data storage device 65 may be used to store, or maintain, calibration data, biometric data specific to a user, information collected from the HMD 18, and/or a processor-specific application. Another element that is in communication with the processor 24 is the indicator 30, which may notify the user. In an embodiment, the user may be notified that a particular calibration fail to calibrate the HMD 18. The indicator 30 may be a computer graphics display capable of displaying text, another visual indicator (such as an illumination), and/or an audible indicator. Also disclosed is a physical component of the electronic post 10. The securing element 14 is used to connect the electronic post 10 to a desired location.

Figure 7:
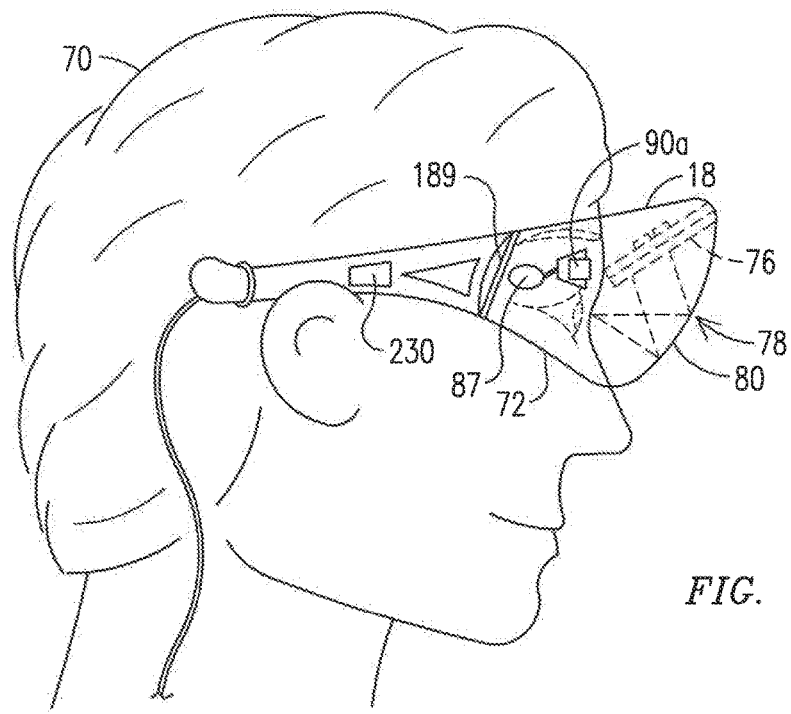
FIG. 7 shows a diagram illustrating a side view of a head-mounted device in accordance with an embodiment.
Figure 8:
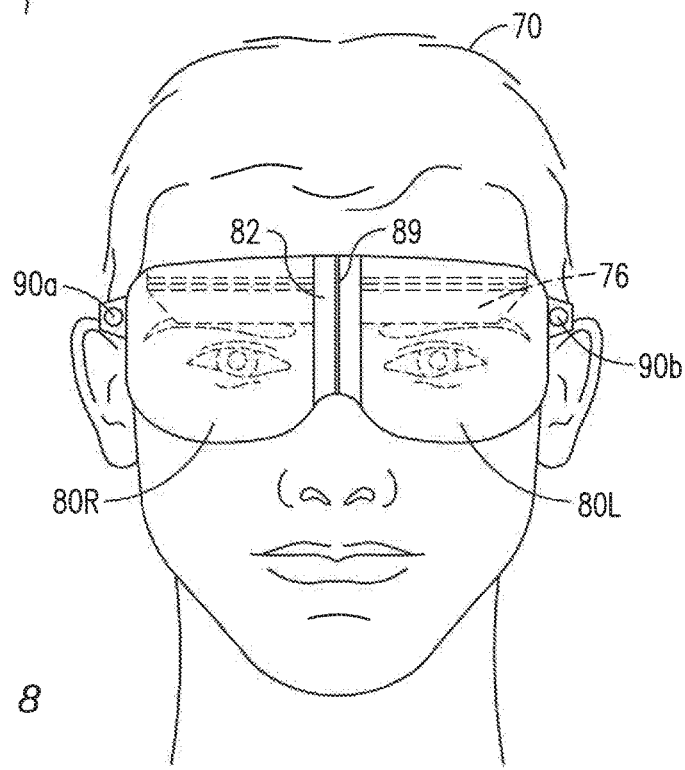
FIG. 8 shows a diagram illustrating a frontal view of a head-mounted device in accordance with an embodiment.

The electronic post 10 may include a data entry port 67. The data entry port 67 may comprise a plurality of configurations. In one embodiment the data entry port 67 may comprise a biometric reader, by way of non-limiting example, a thumb print reader or retinal scanner. The purpose of this form of data entry port is to access biometric information from a particular user based on a biometric characteristic unique to the user. The type of biometric information to be accessed includes, but is not limited to, inter-pupillary distance and depth of eyes in the head 70 (FIG. 7) of the user, height of the user, fingerprints of the user, etc. Such information is needed because each user has a unique view through the HMD 18 due to each user's inter-pupillary distance and depth of the user's eyes in the head, and height (of the eyes from the ground). Thus, alignment of the geometry of the HMD 18 with the head 70 of the user is needed. As described further below, this alignment may be accomplished by adjusting a frame 72 of the HMD 18 or by adjusting vision components that are supported by the frame of the HMD 18. Inter-pupillary adjustment may comprise bringing binocular views of the lens system 83 (such as is shown in FIGS. 7 and 8) closer together or further apart horizontally. By doing so, the images within the HMD 18 are moved with respect to where they would have been placed in the real world. In another embodiment, the user may use a manual adjuster, such as a dial, or even a computer graphical user interface ("GUI") interface to adjust what the user sees through the HMD 18 to the real world.

Another form of the data entry port 67 may comprise a keypad which the user may use to enter information including, but not limited to, biometric information, external environmental conditions, etc. Though disclosed as two distinct embodiments, the data entry port 67 may comprise both the biometric reader and the keypad. As explained briefly above, the types of data which may be entered with the data entry port may also be transmitted from a remote location to the electronic post 10.

In one embodiment, the electronic post 10 may comprise a visual detection device 52 capable of detecting images in both a real environment and the virtual environment.

The processor 24 has access to calibration data. The post includes a receive 16 and transmitter 17. Additional calibration data may be collected through the receiver 16. The receiver 16 may collect additional data specific to where the electronic post 10 is placed with respect to a coordinate system. The docking element 22 may be controlled by the processor 24 and is also configured to secure the HMD 18 to the docking element 22 during movement of the docking element 22. The movement of the docking element 22 may occur with respect to a coordinate system as described above to determine measured data that may be associated with at least one component of the HMD 18. The processor 24 may compare the measured data with the calibration data, and calibrate the HMD 18. More specifically, the at least one component that may be outside of an acceptable tolerance is calibrated with respect to a measurement from the HMD 18.

In another embodiment, the location post may be passive. The post may be located and positioned at a known location and orientation in the real world environment, having a known and overlapping location in a parallel virtual-reality. In a non-limiting example, when used in an operational field or theater, the location post may be located at a pre-selected waymarker or waypoint that the user will pass by or transgress when in the field. Based on its location, location and orientation data about the location post may be stored in a memory device that is not a part of the post, such as at a remote location. The post may include an identifier such as, but not limited to, some form of an identification determinator (a bar code or another form of identification) which identifies the specific location post. The identification determinator may be readable by the HMD 18, such as when the HMD 18 is connected to or docked in the docking element 22 of the location post 10.

In another embodiment, the identification determinator of the location post may be entered into the HMD 18, such as through at least one camera 90a, 90b (FIGS. 7, 8, and 9) on the HMD using optical recognition. The at least one camera 90a, 90b may be configured to capture an identification (ID) fixedly placed on the post. The HMD may be configured to optically recognize the identification of the instant location post based on the captured ID. By way of a non-limiting example, the post includes a code, such as but not limited to a post barcode. The HMD 18 may searches its own internal database to find the location and orientation data associated with the barcode of the post. Alternately, the HMD may communicate through a communications network to search a remote database for the location and orientation data associated with the barcode of the post. Location data may include coordinate information.

Once the HMD 18 is installed in the docking element 22 of the post (passive or electronic), an internal calibration may be performed on the HMD 18 based on location and orientation data regarding the post. An internal calibration may be accomplished based on the HMD 18 accessing a location and orientation data associated with the post (such as, but not limited to a localized database) or by the HMD 18 communicating to a remote location that maintains a database with location and orientation data specific to the post, where the information is associated with the post ID. The processor 24 on the electronic post 10 or the processor 224 on the HMD 18 may be used to perform the calibration.

The passive post may align the location and orientation data of the HMD with both the real world environment and the parallel virtual world. Furthermore, the passive post may allow magnetic declination data to be aligned or updated using external data.

In another embodiment, the user may input the identification determinator into the HMD 18, such as through the data entry port 67 of the electronic post 10 or alternately, an user input mechanism associated with the HMD.

In a non-limiting example, in operation, location and orientation data of the electronic post 10 may be stored in a memory device that is not a part of the post (remote from the electronic post 10).

The HMD may then be placed on the docking element of the electronic post 10. Provided that the electronic post 10 is physically oriented and positioned in accordance with the data regarding its orientation and location stored remotely from the electronic post 10, using its internal processor 224, the HMD 18 is internally calibrated so that its internal representation of orientation and position correspond with the remotely stored data associated with the orientation and position of the electronic post 10 and hence the real-world. FIG. 1a shows an example 400 of HMD 18 alignment with a real world environment 410 simultaneously with a parallel virtual world environment 420. In FIG. 1a, the location post is used to align the parallel virtual world 420 and the HMD 18 with the real world location and orientation of the location post. The orientation may be controlled through the rigid docking fixture of the location post.

The parallel virtual world environment 420 is expected to closely match the geometry of the real world environment 410. However, since the parallel virtual world environment 420 is maintained in a computer that drives the HMD 18, it may not have been lined up exactly with the real world such that the parallel virtual world precisely overlays the real world. Alternately the parallel virtual world environment 420 may not be aligned or nearly aligned with the real world environment 410 if the HMD 18 was just powered on and needs to be programmed with its current location and orientation.

There is a location post setup in the real world 410 and indicated by an "X" denoted by the reference numeral 440 on a structure 415. The X 440 in the real world 410 should match the location of the "X" denoted by reference numeral 450 in the parallel virtual world 420, as would the structure 425 in the parallel virtual world. The HMD 18 also has an "X" denoted by the reference numeral 460 that should overlay the real world's X 440 and the parallel virtual world's X 450 when the HMD is placed at the location 440 in the real world. The HMD 18 may not precisely indicate its position in the real or virtual worlds 410, 420 due to calibration and alignment errors. In an embodiment, the calibration and alignment errors may have formed in the INS 38 of the HMD 18.

The alignment process is configured to align the HMD 18 with the real world 410 and the parallel virtual world simultaneously. To perform the alignment of the HMD 18 with the real world 410 and the parallel virtual world simultaneously, the HMD 18 is placed in the docking element 22 at the location post denoted by X 440 in the real world so that the HMD 18 points in an expected direction. Then, the virtual world location and orientation are set/adjusted/updated by rotating and translating the virtual world electronically in the 3D image generation system (3DIGS) 77 that drives the virtual imagery displayed on the HMD 18. The virtual world may be adjusted to be at precisely the coordinates and rotational state established by the docking element 22 on the location post denoted by X 440 in the real world 410. Hence, the HMD 18 is currently located at a known location and the virtual world is aligned precisely with the HMD and the real world. At this time, the offsets produced by the INS 38 may all be reset to zero for both rotation and translation offsets.

After the HMD 18 is removed from the docking element 22 the INS 38 may start integrating differential motion indicated by the accelerometers 34 and gyroscopes 36 in the INS 38 to estimate the current location of the HMD 18 and the direction in which the HMD 18 is pointing.

After some period of time and amount of motion, the location and orientation reported by the INS 38 may drift. The drift may cause the INS 38 to no longer synchronize the real world 410 with the virtual world 420 and with the HMD 18. Thus, the HMD 18 needs to be aligned again by repeating the alignment process. To repeat the alignment process, the user may place the HMD 18 into an available location post and the alignment process may commence thereafter.

In an embodiment, the alignment of the HMD 18 in the virtual and real worlds is not accomplished by the rotation/motion operations. Instead, the HMD 18 is secured to the docking element 22 of the post. A docked HMD is in a known location and orientation in the real world for which the virtual world in the HMD 18 can be aligned.

A calibration unit 19 may be used to calibrate the electronic post 10. The calibration unit 19 may comprise a global positioning system receiver, a compass, and other equipment to ensure accurate localizing and coordination of the real environment and a virtual environment, usually a parallel virtual environment, with the real environment for HMD 18. In this way, the virtual environment may also be calibrated to bring it into alignment with the real environment for the HMD 18 using the electronic post 10 as a real/virtual shared landmark. Thus, as disclosed further herein, once the electronic post 10 is calibrated and/or located, the HMD 18, and/or several HMDs, may be rapidly aligned by physical attachment to the electronic post 10, where the electronic post 10 communicates with the HMD 18 to provide calibration and location information to the HMD 18.

Calibration of the post may also be performed manually. In an embodiment, a manual calibration is adapted to use surveying and metrology techniques using the location and orientation data entered into the post or stored in an external database.

In an embodiment the separate receiver 16 and the separate receiver 17, may be a single unit or transceiver. Thus the term "receiver/transmitter" may be used to describe the receiver and transmitter as separate units or as a single unit or transceiver. The receiver/transmitter 16, 17 may be used to communicate, usually digitally, with a head-mounted display ("HMD") 18 to obtain information from the HMD 18 when the HMD is placed in a certain pose, and/or moved around, or to transmit to the HMD 18 how to adjust its internal calibration tables when a calibration function is performed. In another embodiment an additional, or second, receiver/transmitter may be provided. The first receiver/transmitter 16, 17 may be dedicated to allowing the HMD 18 to communicate with the electronic post 10. The second receiver/transmitter may be used to form a communication network with all HMDs 18 which are calibrated by the electronic post 10. The network may be a wireless network. Similarly the connection for the first receiver/transmitter 16, 17 may be in a wireless network. Though the receiver/transmitter 16, 17 is disclosed, it may not be needed in order to calibrate and provide location information to the HMD 18. In another embodiment, a wired or physical connection between a processor 24 and the HMD 18 is provided. Location and calibration information is communicated directly from the processor 24 to the HMD 18. As a non-limiting example, the wired connection may be a direct wired Ethernet RJ45 connection. The wired connection may be galvanic. In another embodiment, the connection may be an optical connection. Also shown in FIG. 1 is a data entry port 67. Further detail regarding the data entry port 67 is provided during a discussion of FIG. 6.

The electronic post 10 may include a plurality of attachment elements or docking elements 22 to which the HMD 18 may be connected, docked, or secured. Though only one docking element 22 is illustrated, multiple docking elements may be provided where the docking elements may be provided for different types of HMDs 18. The docking element 22 may also provide a connection through which location and/or orientation information may be transmitted to the HMD 18, with accuracy benefiting the HMD 18 from being at an exact same location that is associated with the information being obtained with respect to the electronic post 10. Once the communication of information from the electronic post 10 to the HMD 18 is complete, the HMD 18 will have an accurate initialization from which to base its subsequent movement calculations which in turn will assist with ensuring the correct position and orientation in both a virtual environment and an actual environment. More specifically, by securing the HMD 18 to a particular known location based on location coordinates which are communicated to the HMD 18, the HMD 18 is able to be aligned to the same location as the electronic post 10 as well as pointing in a known direction as identified by the electronic post 10.

The electronic post 10 may also provide local magnetic declination information to the HMD 18. Magnetic declination varies both from place to place and with the passage of time. By way of non-limiting example, in the United States, the magnetic declination varies from 20 degrees west in Maine to 0 degrees in Florida, to 10 degrees east in Texas. This means that a compass adjusted at the beginning of a journey to each of these states would have a true north error of over 30 degrees if not adjusted for the changing magnetic declination. The electronic post 10 may be used to program an identified magnetic declination into the HMD 18. This may be accomplished with a table or database which contains declination adjustment values based on locations. Based on the electronic post 10 determining its location, a declination adjustment value may also be ascertained and provided to a magnetometer 28 of the HMD 18. The magnetometer 28 of the HMD 18 may be a self-calibrating magnetometer, based on the magnetic flux and geometrical position of a sensor in the HMD 18, which may determine an approximation of a direction of true north. In another embodiment, the electronic post 10 has a magnetometer 26 which is first adjusted based on the magnetic declination information, and the setting from this magnetometer 26 is communicated to the HMD 18 to adjust its magnetometer 28.

In an embodiment, the magnetometer 26 may be optional in the electronic post. However, the electronic post should be provided with a current magnetic declination for the location of the post and the date. Magnetic declination may slowly change over years. The magnetic declination information may be communicated to the HMD for use in internally calibrating the HMD's magnetometer. A magnetometer 26 in the electronic post 10 may assist in calibrating the post in the case of a moveable post being set up in the field.

The docking element 22 may be motorized to twist, rotate, or translate the HMD in certain directions, or angles, at certain rates of accelerations. In essence, movement of the HMD 18 is performed to adjust sensitivity to motion of the HMD 18. Because of such movement, the docking element 22 is rigidly connected to the HMD 18. A rigid connection is also provided where milliradian and millimeter resolution in geophysical alignment may be realized. The twisting, rotating, and translating using the docking element 22 does not perform its functions with respect to a fixed location or orientation, but instead operates to address dynamic information such as, but not limited to, rates of change. In a non-limiting example, this is done to ensure that if the HMD 18 twists at X degrees/second, the INS may report an accurate X degrees/second and then the HMD processor 224 may use the information to move the portrayed virtual environment by X degrees/second with respect to the real world viewable through the HMD 18.

These movements may be provided to calibrate an accelerometer 34 and/or a gyro rate tracker, or gyroscope, 36 of the INS 38 which is a part of the HMD 18 since accelerometers and gyroscopes in particular may drift over time. With respect to the gyroscope 36, the docking element 22 would turn the HMD 18 at a known constant or acceleration rate to ensure that the gyroscope 36 of the HMD 18 correctly reflects that rate. If the gyroscope 36 does not reflect the correct rate, information from the electronic post 10 may be provided to the HMD 18 to correct the gyroscope 36. In an embodiment, if the docking element 22 turns the HMD 18 twenty-five (25) degrees, this information is processed by the processor 24. If the gyroscope 36 reports to the processor 224 or 24 that it was turned thirty-two (32) degrees, then the processor 224 or 24 will conclude that the gyroscope 36 requires calibration, and will provide information to the HMD 18 to complete the calibration.

Location is determined by integrating accelerometer information with information about a base starting point, such as location of the electronic post 10. The electronic post 10 coordinates the HMD 18 with respect to a certain coordinate system. Such a coordinate system used may be the geocentric coordinate system. The geocentric coordinate system is a three-dimensional, earth-centered reference system in which locations are identified by their x-, y-, and z-values. The x-axis is in the equatorial plane and intersects the prime meridian (Greenwich). The y-axis is also in the equatorial plane; it lies at right angles to the x-axis and intersects the 90-degree meridian. The z-axis coincides with the polar axis and is positive toward the North Pole. The origin is located at the center of the sphere or spheroid. The electronic post 10 is then able to determine whether the HMD 18 requires calibration along the x-axis, y-axis, z-axis, as well as angles of rotation in three dimensions about the center of the gyroscope 36 in the HMD, known as roll, pitch and yaw.

Figure 12B:
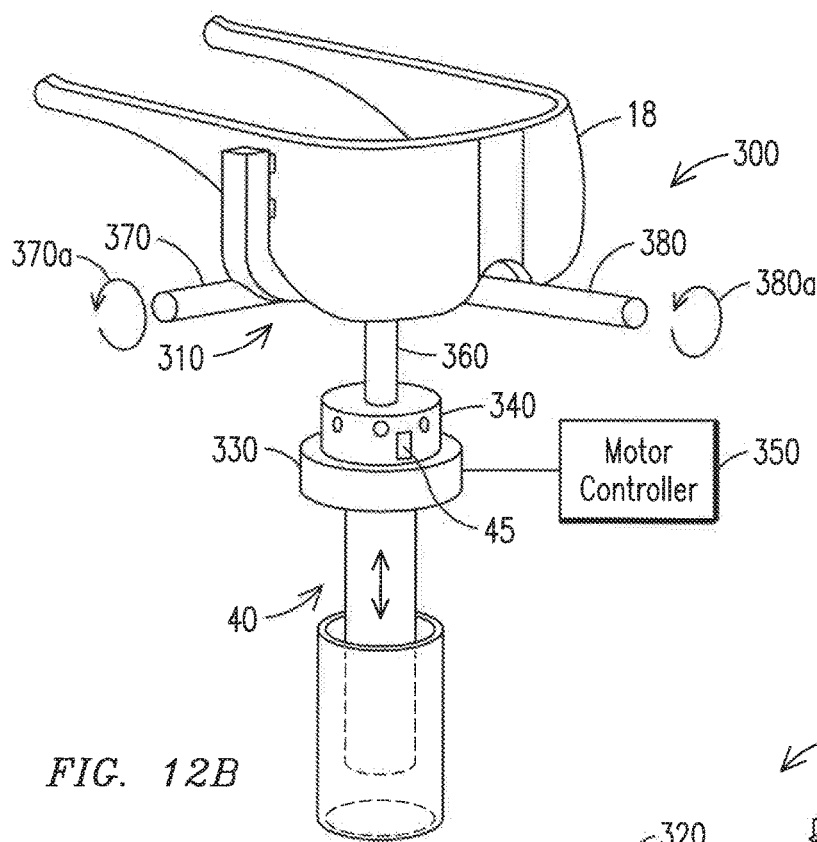
FIG. 12b shows an HMD installed in the rotational motion calibration fixture in accordance with an embodiment.
Figure 12A:
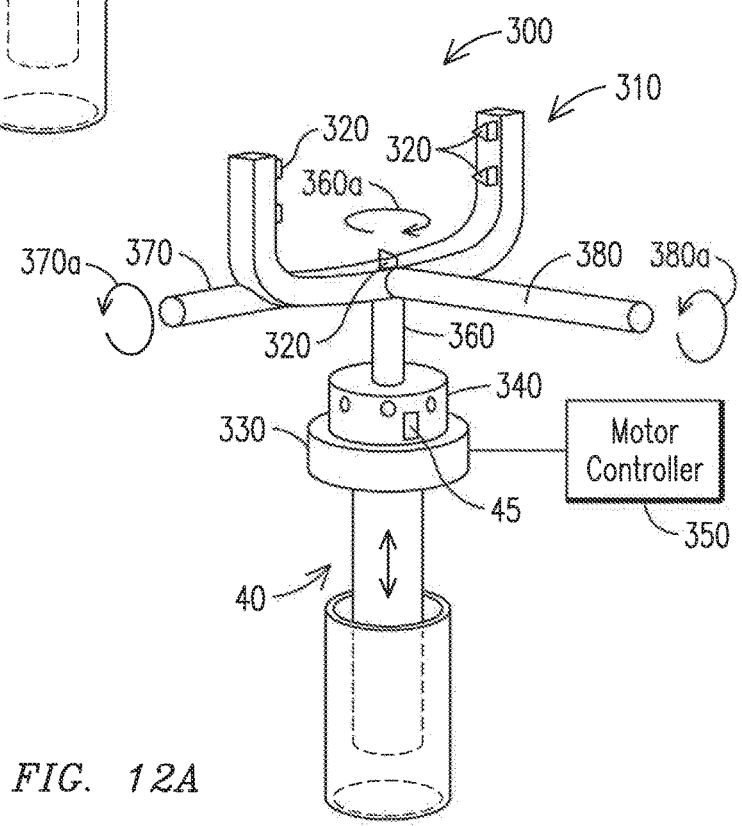
FIG. 12a shows the rotational motion calibration fixture in accordance with an embodiment.

In an embodiment, a rotation calibration process for the HMD may be accomplished. Thus, the docking element 22 may comprise a rotational motion unit 300 as shown in FIG. 12A with a HMD rotational attachment point 310 for attaching or docking of an HMD. FIG. 12B illustrates an HMD attached to the rotational motion unit 300. In an embodiment, the HMD rotational attachment point 310 is a cradle for seating an augmented reality device. The HMD rotational attachment point 310 is attached and/or secured to a rotational fixture securing device 340 configured to rotate the rotational attachment point 31 by motor 330. When the HMD 18 is docked in the HMD rotational attachment point 310, the HMD 18 is aligned with the location and orientation of the real world and the virtual world. The attachment slugs 320 on the HMD rotation attachment point 310 mate with matching locations on the HMD 18 to hold the HMD 18 securely in place when docked. The motor 330 attached to the rotational fixture securing device 340 is commanded by the motor controller 350 to twist the axis of the rotational attachment point 310 that is currently attached to the rotational fixture securing device 340.

The HMD rotational attachment point 310 may be removed from the rotational fixture securing device. In an embodiment, the HMD rotation attachment point 310 includes a plurality of axis connectors 360, 370 and 380, each axis connector corresponding to a different axis of rotation. In the illustration, axis connector 360 when connected to the rotational fixture securing device 340 would rotate the HMD and the HMD rotation attachment point 301 in a first direction 360a or the reverse of direction 360a. When the axis connector 370 is connected to the rotational fixture securing device 340, the HMD and the HMD rotation attachment point 301 may be rotated in the a second direction 370a or the reverse of direction 370a. When the axis connector 380 is connected to the rotational fixture securing device 340, the HMD and the HMD rotation attachment point 301 may be rotated in the a third direction 380a or the reverse of direction 380a.

In view of the above, rotational information associated with the HMD 18 may be calibrated about three axes.

In an embodiment, the rotation calibration process may cause rotations about a plurality of central locations or axes in relation to the HMD. During the rotation calibration process, waveforms may be recorded. The waveforms may be compared to the waveforms generated during calibration accordingly. In an embodiment, the rotation calibration process may use the gyroscope 36. The rotation calibration process may include turning or rotating the docking element 22 holding the HMD 18 at various angles where instantaneous rotational velocity and intermediate positions, at pre-defined stops, are recorded and then used to calibrate the HMD 18 with actual physical rotations. In an embodiment, the docking element 22 may be a rotational motion unit, or at least comprise a rotational motion unit which may provide for the docking element 22 to operate as described.

In another embodiment, the location of the HMD 18 may be updated periodically by the user by performing an optical sighting and triangulation of fiducial marks in the real environment.

In another embodiment, the docking element 22 may also move the HMD 18 up and down, front to back, and/or side to side. Doing so will allow the electronic post 10 to provide for a static calibration mode (determining actual location and orientation of the HMD 18), a steady velocity mode, and a steady acceleration, where the steady velocity mode and the steady acceleration modes may be performed for both translation (change in position as opposed to orientation) and rotation of the HMD, thus calibrating the accelerometer 34.

A linear translation unit 40 shown in FIG. 1 may provide a straight-line motion up and down to the docking element 22 and, thus, the HMD docked in the docking element 22. The docking element 22 may be re-inserted to get three different axes of linear motion, as described in relation to FIGS. 12A and 12B. The linear translation unit 40 may comprise an electronic motor, a piston, a damped solenoid or a spring-loaded shaft without a motor. The spring-loaded shaft may allow the HMD to bounce or move up and down. A motion detection unit 45 may be mounted on the docking element 22. The motion detection unit 45 may be pre-calibrated to respond accurately to the HMD motion in translation and rotation, and may serve to generate the calibrated waveform 520 Wave 1 of FIG. 5.

In an embodiment, the docking element 22 may be configured to spin in three different axis orientations automatically.

If the accelerometer 34 or gyroscope 36 cannot be aligned, either a user interface or indicator element 30 on the electronic post 10 or a visual feedback element provided within the HMD 18 will notify the user of this fact, and/or a status of the calibration. Possible reasons why the accelerometer 34 may not calibrate include, but are not limited to, lower power, component damage, etc. The HMD 18 may also comprise an indicator 230, such as on an outer surface of a frame 72 of the HMD 18 (illustrated in FIGS. 7 and 9). The electronic post 10 may also include an indicator 30. Notification by the indicator 230 may be accomplished audibly and/or visually. When audible, a sound may emit from a speaker during the calibration immediately when done. When visual, a text message may be displayed or another visual indication is provided within the HMD 18 regarding a state of calibration. Additionally, a printout of an error may be provided in another embodiment.

Figure 2:
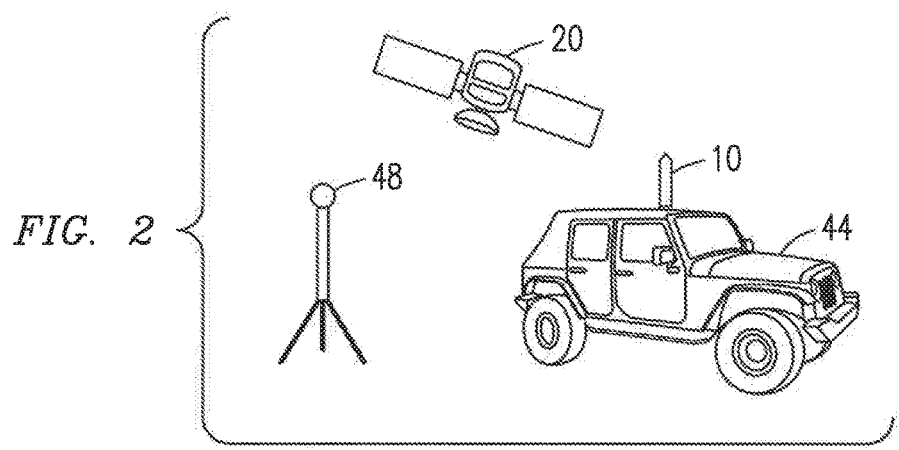
FIG. 2 shows a location post in use in an operational environment in accordance with an embodiment.

FIG. 2 shows the location post in use in an operational environment. As illustrated the electronic (location) post 10 is attached to a roof of a vehicle 44. A global positioning system ("GPS") satellite 20 is also disclosed. When the electronic post 10 is ready to be used, such as with the vehicle stationary or the electronic post 10 secured directly to the ground, the receiver 16 may collect information to establish an accurate location and/or orientation reading with respect to the Earth or some other coordinate system. Such accuracy is useful because when the HMD 18 is attached to the electronic post 10, the location of the HMD 18 is in a position and orientation that is directly traceable to the location of the electronic post 10. This then allows for calibration with nearly as much accuracy as possible, such as within millimeters, as the orientation of electronic post 10 is known. The information collected may be based on information received through the receiver 16 from the GPS 20. The electronic post 10 may also be calibrated using an optical approach by relying on known or pre-established visual landmarks or Real Fiducial Marker (RFM) 48 to triangulate the location of the electronic post 10, as is explained in further detail below. Once the location information is collected by the electronic post 10, the location information is either processed by the electronic post 10 to update calibration charts with respect to location or the location information is communicated directly to the HMD 18, which in turn applies the location information to perform its own updates.

In another embodiment, three-dimensional orthogonal implementation of differential GPS may be used to obtain orientation and location information to an accurate degree. Though not disclosed herein, those skilled in the art will readily recognize that other techniques of obtaining such location information may be used wherein the receiver 16 is configured to receive such information based on the technique used. In an embodiment, another technique may comprise the use of GPS while in view of its satellite(s), or another technique which allows for measuring orientation and location with respect to the Earth. Using differential GPS information may result in the location being known within ten (10) centimeters.

FIG. 3 shows an advanced electronic post with a horizontal linear motion calibration system 210. This is another potential way to induce the linear translation besides that of the linear translation unit 40. The advanced electronic post may be an INS-calibrating electronic post. The horizontal linear motion calibration system 210 may be used to further calibrate the accelerometer 34 of the HMD 18. Though a vertical or near vertical linear motion calibration system may be utilized, the horizontal linear motion calibration system removes or minimizes effects associated with gravity during a calibration process. The advanced electronic post 270 may have an extendable arm 230 which transitions, or extends, from a vertical position (not shown) where it is parallel with the advanced electronic post 270 to a horizontal position, as shown. A hinge 240 is illustrated as providing a connection point to allow the extendable arm to be transitioned from its vertical position to its horizontal position. Though not necessary required, a support rod 260 is provided to ensure stability of the extendable arm 230 when in the horizontal position. A leveling device 250 may be used to determine that the extendable arm is at an acceptable horizontal position. The leveling device may be a spirit level 250, as shown in FIG. 3. The translation unit 40 is provided to move an attached HMD 18 sideways. An attachment point or docking element 22 is provided to connect the HMD 18 to the translation unit. In an embodiment, the translation unit 40 may comprise a belt drive system 220 to move the HMD 18 in the sideways motion. The belt drive could be replaced by any suitable linear motion device. A motor 42 is also provided to actuate components of the translation unit where the attachment point 22 may moves in a sideways motion.

Based on the above, movement-based dynamic calibrations are all relative where they define a first or second derivative of position and/or orientation. The stationary measurement, specifically location and orientation information, is used to define the actual position and orientation.

The HMD 18 may be used in a multi-user augmented reality world. When used in such an instance, Distributed Interactive Simulation ("DIS") dead reckoning information, or parameters, may be used from the HMD 18 to provide accurate location and directional information to other entities in the multi-user augmented reality world. More specifically, the calibration of the HMD 18 output may be extended to include determining the accuracy of translational and rotational dead-reckoning parameters and the position parameters that the HMD 18 may transmit to describe its position and trajectory. Then other entities in the simulation may see the location and direction of heading of the HMD 18, in order to re-create a view of the ongoing simulation, but at a remote location. For a given acceleration and velocity, a certain numerical value may be placed into a "DIS packet" for data transmission across a network to other simulation entities. The calibration aspect of the electronic post 10 can ensure that these values are correct for a given acceleration, position, and velocity. This may include various derivatives of orientation and position, where the HMD 18 provides an as-close-as-possible-to-ground-truth network transmission packet to the other entities for incorporation in a distributed Live-Virtual-Constructive exercise.

Figure 4:
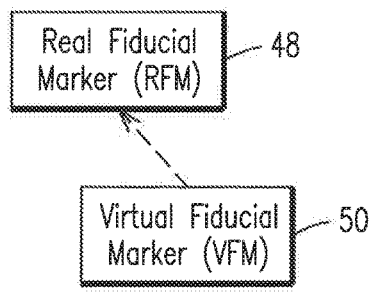
FIG. 4 shows a diagram illustrating a calibration technique in accordance with an embodiment.

FIG. 4 shows a diagram illustrating a calibration technique utilizing a Real Fiducial Marker (RFM) and a Virtual Fiducial Marker (VFM). In one embodiment, the electronic post 10 may comprise a visual detection device 52 (illustrated in FIG. 6) capable of detecting images in both a real environment and the virtual environment. With the HMD 18 secured to the electronic post 10 by the docking element 22, the HMD 18 is positioned where a viewpoint of the lenses 74 (as illustrated in FIG. 7) on the HMD 18 is directed towards the RFM 48. The visual detection device 52 detects both the RFM 48 and the VFM 50. As a non-limiting example, if the RFM 48 and VFM 50 are not aligned, or do not appear as being overlapped, the electronic post 10 will adjust aspects (explained in further detail below) of the HMD 18 until alignment is achieved. The distance to the marker 48 is also a known distance. The RFM 48 has a known height and distance from the electronic post 10. Though the RFM 48 is illustrated as some form of a stand in FIG. 2, the RFM 48 has a plurality of other configurations. The RFM 48 may simply be a mark on an object (such as a wall), a mark on the ground, a natural object in an area (such as a rock), etc. Though not required, the RFM 48 may be specially marked, such as with a particular color. The intent is that the RFM 48 is distinguishable from objects visible in the real environment. The RFM 48 is used to align a VFM 50 with the RFM 48. In another embodiment, the user would wear the HMD 18 and may then perform the calibration of the VFM 50 to the RFM 48 by way of an adjuster which is a part of the HMD 18 or through an electronic or computer-based interface. The adjuster, or a variation, could also actuate adjustment interfaces, or displacement elements 89 and 189 (as further illustrated in FIG. 7 and FIG. 8), to adjust aspects of the HMD 18 until acceptable alignment from the user's perspective is achieved. Generally, adjustments to the virtual world to overlap with the real world may be performed electronically using the 3DIGS 77. Physical adjustments to the HMD may be needed by the user to properly situate their gaze in the HMD system.

Figure 5:
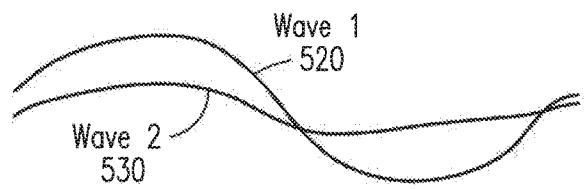
FIG. 5 shows a diagram illustrating waveform examples used in calibration.

FIG. 5 shows a diagram illustrating waveforms. These waveforms may correspond to a measured output of the INS 38 when the HMD 18 is moved in a controlled manner. Peak accelerations may be displayed in these types of waveforms such as, but not limited to, an output value corresponding to acceleration or velocity when the HMD 18 is physically moved in a controlled manner that is supposed to produce an expected acceleration and/or velocity when moved in a periodic, sinusoidal, back-and-forth manner (or motion), or twisting manner for rotational calibration.

As illustrated, the electronic post 10 may have already been provided or calculated an expected resultant, or waveform, Wave 1 520. This wave can also be read off the motion detection unit 45 as the HMD is moved during calibration. When the HMD 18 is secured to the electronic post 10 for calibration, the HMD 18 is moved certain directions by the calibration motors of the electronic post 10, and a new or actual measurement is made, Wave 2 530. Because of the amplitudes of the new wave, Wave 2 530, this wave may differ from Wave 1 520 as a result of any number of factors such as, but not limited to, a low battery, malfunctioning components, a need for calibration, etc. Once the basis for the difference is addressed such as, but not limited to, calibration being performed, another measurement may be made to determine if Wave 2 530 is within an acceptable range, or tolerance of Wave 1 520. If calibration does not change Wave 2 530 or fails to bring Wave 2 530 within tolerance of Wave 1 520, the indicator 230 on either the HMD 18 or the indicator 30 on the electronic post 10 or some other notification means may notify the user that calibration was not successful, or that another issue is affecting the HMD 18. The calibration may require a factor, or some other adjustment, to be applied to an aspect of the HMD 18 where Wave 2 530 is within an acceptable range, or tolerance. A goal of the calibration is to make the measured waveforms align with the expected waveforms for the given motion. The waveforms correspond to the expected and actual output of the HMD's INS when it is moved in a controlled manner.

FIG. 7 shows a side view representation of a head-mounted device (HMD) and FIG. 8 shows a front view representation of the head-mounted device (HMD). Though two particular HMD devices are disclosed herein in detail, the electronic post 10 may be applicable for use with a variety of HMD devices and other virtual reality devices. In one embodiment, the HMD 18 may be an optical see-through, augmented reality, binocular viewer. Because an optical see-through, augmented reality, binocular viewer is typically the most complex form of the HMD 18, explanation of the HMD 18 herein will primarily discuss embodiments of this type. In these discussions, it is understood that the principles discussed herein are equally applicable to optical see-through systems, augmented reality systems, monocular viewer systems, video see-through systems, augmented reality systems, binocular systems, biocular systems, and monocular viewer systems, wherein each system is an "augmented reality system."

As shown in FIGS. 7 and 8, the HMD 18 may further comprise a frame 72 adapted to be worn by the user and supported by the user's nose and ears in a manner similar to that in which eyeglasses are worn. The HMD 18 may have a variety of configurations and can, in various embodiments, resemble conventional goggles, glasses, helmets, and the like. In some embodiments, a strap may be used to hold the HMD's frame 72 in a fixed position with respect to the eyes of the user. In general terms, the outside surface of the HMD 18 may assume any form that holds the optical system in the required orientation with respect to the HMD's display(s) and the user's eyes.

The HMD may comprise at least one image display system 76 and at least one optical system 78 that further comprises a reflective optical surface 80. The optical surface 80 may be a free space, ultra-wide angle, reflective optical surface ("FS/UWA/RO surface"), which by necessity is curved. In some embodiments, the FS/UWA/RO surface 80 may be the entire optical system 78. The surface 80 may be purely reflective or may have both reflective and transmissive properties, in which case, it can be thought of as a type of "beam splitter."

The surface 80 may completely surround one or both eyes, as well as the at least one image display system 76. In particular, the surface 80 may curve around the sides of the eyes and toward the sides of the face so as to expand the available horizontal FOV. In one embodiment, the FS/UWA/RO surface 80 may extend up to 180 degrees or more (e.g., more than 200 degrees). As best illustrated in FIG. 8, the HMD 18 may include two separate FS/UWA/RO surfaces 80 for the user's two eyes which are separately supported by the frame 72 and/or a nasal ridge piece 82 of the frame 72. Alternately, the HMD 18 may employ a single FS/UWA/RO surface 80 that serves both eyes with a single structure, some portions of which are viewed by both eyes and other portions of which are viewed by only one eye.

An optional lens system 83 is also provided having at least one lens 74, such as without limitation, a Fresnel Lens. The lens system 83 is supported by the frame 72 and is located between the image display system 76 and the reflective optical surface 80. The lens system 83 may be provided to modify diopter characteristics of the light emanating from a surface of the display system 76.

The nasal ridge piece 82 of the frame 72 may be a vertical bar or wall which provides a separation between two FS/UWA/RO surfaces 80, one for each of the user's eye. The nasal ridge piece 82 may also provide a separation between the fields of view of the user's two eyes. In this way, the user's right eye can be shown a first representation of three-dimensional physical reality in the environment by displaying a first image to the right eye via a first image display device and a first FS/UWA/RO surface 80R, while the user's left eye is shown a second representation of three-dimensional physical reality in the environment by displaying a second image to the left eye via a second image display device and a second FS/UWA/RO surface 80L. A separate display device/reflective surface combination thus services each eye of the user, with each eye seeing the correct image for its location relative to the three-dimensional physical reality in the environment. By separating the user's two eyes, the ridge piece 82 of the frame 72 allows the image applied to each eye to be optimized independently of the other eye. In one embodiment, the nasal ridge piece's vertical wall may include two reflectors, one on each side, to allow the user to see imagery as he/she turns his/her eyes nasally, either to the left or to the right.

The frame 72 may further comprise at least one adjuster 87 to modify a physical position of a component of the frame 72. The physical position of a component of the frame 72 may be changed or be adjusted based on inter-pupillary information known about the user or a known height of the user (relative to the height of the eyes from the ground). This may be done to ensure that the HMD 18 is in accordance with a viewpoint of the user. The adjustment may occur at a joint, extension, or hinged element, or displacement element 89, located at specific locations to provide a desired adjustment. In an embodiment, depending on the inter-pupillary distance apart and depth of eyes in the head 70 of the user, the nasal ridge piece 82 may require adjusting to allow for the HMD to best accommodate a particular user. The adjuster 87 may be activated to expand or contract a width of the frames measured from side to side of the user, where the frame has a section, the displacement element 89, which extends along an inner track on the nasal ridge piece.

Figure 9:
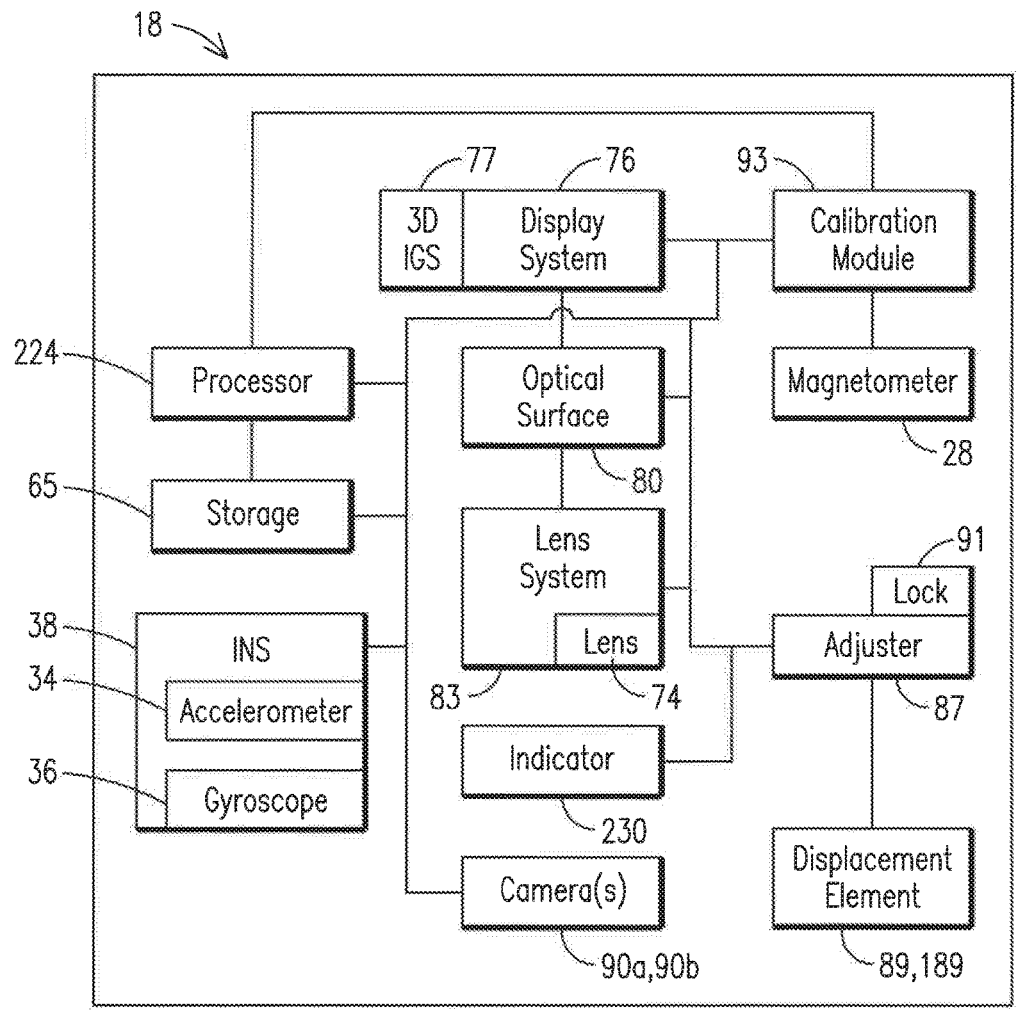
FIG. 9 shows a block diagram illustrating elements of the head-mounted device in accordance with an embodiment.

In another embodiment, the adjuster 87 may be activated to change the spacing between the lenses on the face of the user based on inter-pupillary information about the user. The adjuster may also be configured to allow for manual adjustment. Adjustment may be accomplished with the displacement element 89 having hinged tendencies also associated with the nasal ridge piece 82. The intent of both of these adjustments is to bring the binocular views closer together or further apart. By doing so, this action moves where virtual images are supposed to point in the outside world as viewed by the user with the user's unique view. Other approaches may include, but not limited to, providing displacement element(s) to move placement of the image display system 76, angling of the reflective optical surface 80, and/or positioning of the lens system 83 (more particularly at least one lens 74 of the system as both are illustrated in FIG. 9). The adjustments may also be made electronically in the HMD by moving the imagery left, right, up, or down to accommodate the locations of the user's eyes in their head.

The adjuster 87, or multiple adjusters, may also be provided to adjust the image display system 76 with respect to the frame 72, the reflective optical surface 80 with respect to the frame 72, and/or the lens system 83 (or lens 74) with respect to the frame 72. The adjuster 87 may be an analog adjustment knob, digital adjustment knob, and/or a combination of these means to adjust the HMD 18. The adjuster 87 is also ridged enough where, when not being used, it will not slip or inadvertently make an unwanted adjustment. In one embodiment, a locking mechanism 91 is provided to prohibit such errors from happening.

The processor 224, which may be a part of an electronics package, is attached to the frame 72 of the HMD 18, and may also be used to operate the adjuster 87. In one embodiment, the docking element 22 is configured to secure the HMD 18 at attachment points that provide for communication with the adjuster 87 and allows for free movement of the parts, the displacement element 89 or 189 of the HMD 18 which may be moved during an adjustment. When docked, a particular user's biometric information that resides within the electronic post 10 or on a remote networked database may be accessed and communicated to the processor 224 of HMD 18. The HMD processor 24 may then actuate the adjuster 87 to configure the HMD 18 to best accommodate the particular user. The adjuster 87 may also be manually operated. Thus, instead of, or in combination with, relying on the electronic post 10 to make adjustments, the user may wear the HMD 18 and may perform a manual adjustment.

By having manual control, the user may perform some calibration techniques manually. In an embodiment, with respect to the calibration disclosed above with respect to FIG. 4 regarding the use of the RFM 48 and the VFM 50, this calibration may be completed manually. Wearing the HMD 18, the user can see the RFM 48. With the VFM 50 also virtually displayed, the user may utilize the adjuster 87 to align (such as by overlapping) the RFM 48 and VFM 50 by moving the VFM 50 to overlap the RFM 48. Once manually calibrated, the locking mechanism 91 is used to prevent the adjuster 87 from inadvertently making a change to the calibration. This calibration will more likely be performed electronically as the user moves the location of the VFM, visible to them on the HMD screen, to overlay the RFM in the outside world. The user can control the electronic location of the VFM through computer interfaces including knobs, keyboards, and computer mouse devices.

Additionally, the height of the user, more specifically the distance of the user's eyes from the ground, may be communicated to the HMD 18 to adjust the HMD 18 to further assist in generating the virtual image in the HMD 18 at a correct location, such as by assisting in establishing a viewpoint that the user looks through into the virtual reality world.

FIG. 9 shows a block diagram illustrating elements that may be a part of an augmented reality device. The HMD 18 may comprise a processor 224, a storage device 65, display system 76, the reflective optical surface 80, the INS 38 which may comprise the accelerometer 34 and the gyroscope 36, an indicator 230, a calibration module 93, and the magnetometer 26. Depending on an embodiment of the HMD 18, at least lens 74 or lens system 83 may or may not be provided. Though many of these components may not be supported by the frame 72, at least the optical surface 80 and or lens system 83, at least one accelerometer 34 and at least one gyroscope 36 are supported by the frame 72. With respect to at least the accelerometer 34 and the at least one gyroscope 36, as these are what are being calibrated, with respect to the frame 72, as the frame moves these components are calibrated correctly to electronically indicate the location, motion, and orientation of the frame 72. When the HMD 18 is in use, these components will move with respect to movement of the frame, thus continuing to indicate the location, motion, and orientation of the frame 72.

Also, a part of the frame 72 may comprise the adjuster 87, locking mechanism 91, and displacement element 89. The calibration module 93 may perform geo-location calibration of the HMD 18. It may also be configured to perform orientation calibration of the HMD 18. The calibration module 93 also may perform dynamic INS calibration. The calibration module 93 may also perform a calibration based on a user's biometric data. Furthermore, the embodiment disclosed with respect to FIG. 4 may also be accomplished likely with the user manually performing the calibration to ensure that the final calibration is specific to the user. The calibration module 93 may also be capable of adjusting aspects of the HMD 18, such as angle or placement of lens 74 on the HMD 18, by techniques disclosed herein. The calibration module 93 may be a part of the processor 224 of the HMD 18, or a separate processor.

Based on the embodiments disclosed herein and with further reference to FIG. 1, a system is provided which may include the HMD 18 and the electronic post 10, which may also be referred to as a portable calibration unit. The term "portable" is used because as explained, the electronic post 10 is configured to be placed wherever the user desires to set up the electronic post 10. The HMD 18 has a frame 72 and augmented reality components 76, 80, 83 which are supported by the frame 72. The augmented reality components include the image display system 76, the reflective optical surface 80, and/or the lens system 83, all of which are disclosed above. The HMD 18 may have at least one displacement element 89 and/or 189 as described above. Various types of calibration which may be performed on the HMD when connected to the electronic post 10 may be generally considered as geo-location calibration, orientation calibration, dynamic inertial navigation system calibration, and biometric-based calibration. The optional displacement element 89 or 189 may change a physical placement of the frame 72 and/or at least one of the augmented reality components 76, 80, 83 with respect to the frame 72 based on a calibration result, most specifically the biometric-based calibration. The system may further comprise the locking mechanism 91 to prevent the optional adjuster 87 from performing an unwanted adjustment.

Figure 10:
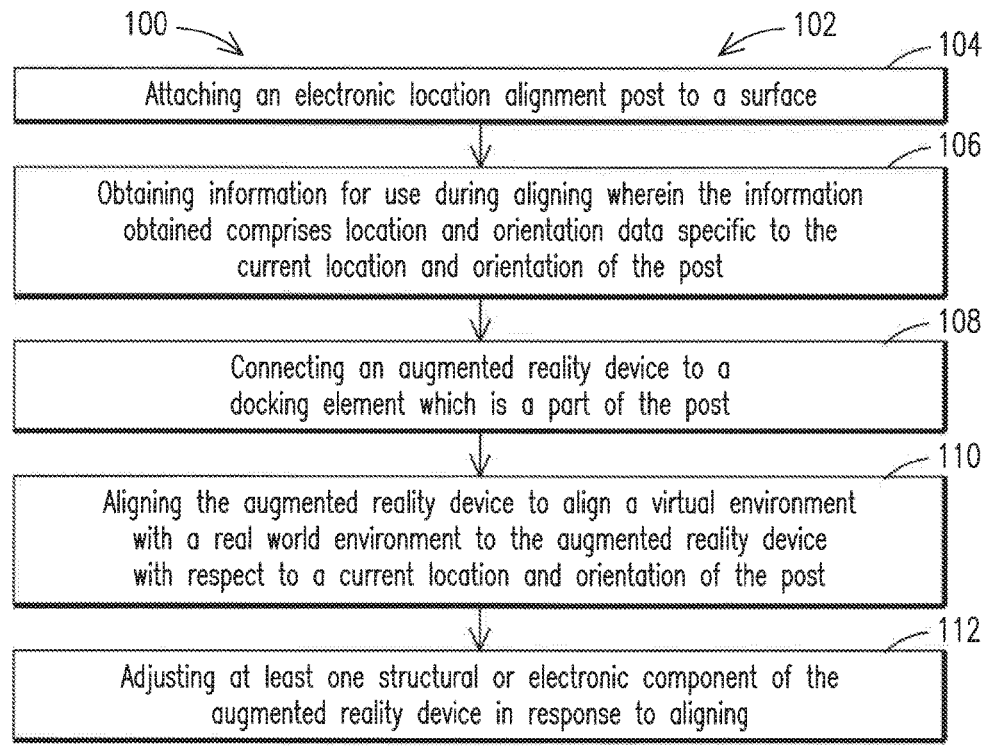
FIG. 10 shows a flowchart of a method of an embodiment.

FIG. 10 shows a flowchart illustrating a method of an embodiment. The flowchart 100 illustrating the method 102 comprises attaching an electronic calibration and/or location post to a surface, at 104. The surface may be within a field of operation. The method may further comprise connecting an augmented reality device to a docking element of the location post, at 108. The location post may be a passive post, an electronic post, or an advanced electronic post. The method may also comprise calibrating the augmented reality device to align a virtual environment with the real world environment of the augmented reality device with respect to a current location and/or orientation of the post, at 110. The method may also comprise obtaining information about a location and/or orientation specific to a current location and/or orientation of the post, at 106. The information may be used during calibrating.

The calibrating, at 110 may further comprise adjusting location information and orientation data of the augmented reality device with respect to a location and orientation of the post, at 112. Additionally, calibrating, at 110, may further comprise adjusting at least one structural component of the augmented reality device in response to calibrating. The above steps of the method 100 may be performed in the order shown, a different order or one or more steps may be performed contemporaneously.

Figure 11:
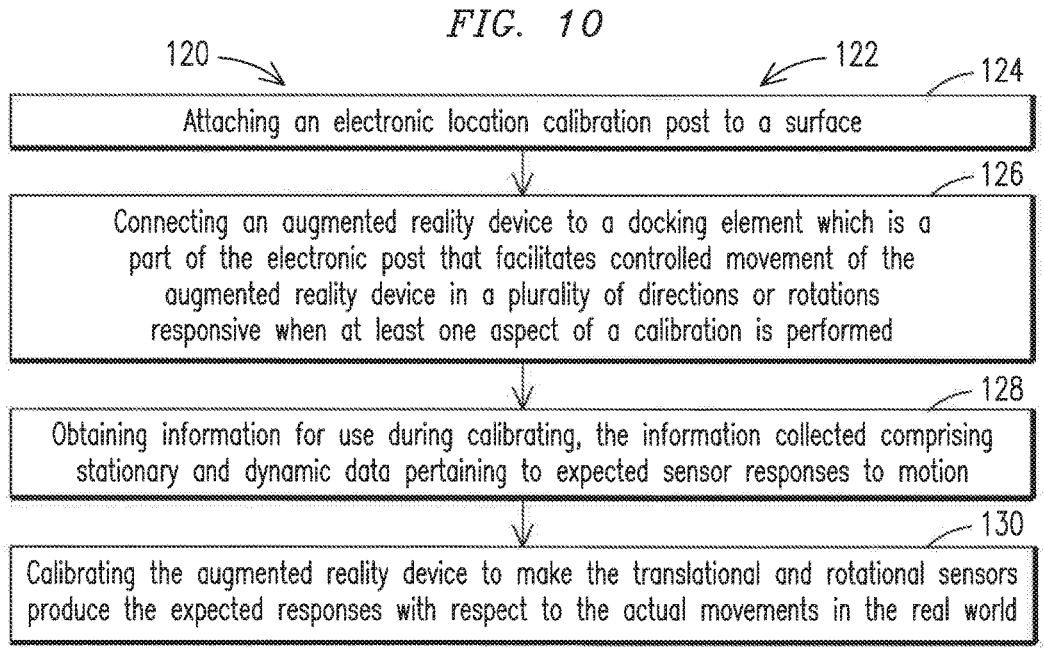
FIG. 11 shows a flowchart of another method of an embodiment.

FIG. 11 shows a flowchart illustrating another method of an embodiment. The flowchart 120 illustrating the method 122 may comprise attaching an electronic calibration and/or location post to a surface, at 124. The method 122 may further comprise connecting an augmented reality device to a docking element which is a part of the post and facilitates controlled movement of the augmented reality device in a plurality of directions responsive when at least one aspect of a calibration is performed, at 126. The method 122 may further comprise obtaining information for use during calibrating, the information collected comprising dynamic data, at 128.

The calibrating, at 130, may further comprise moving the augmented reality device while secured to the docking element in defined directions and/or at defined rates and accelerations about a three-dimensional coordinate system and/or rotating angularly with respect to each axis of the three-dimensional coordinate system as needed to determine a measurement of a same kind as the collected information, comparing the measurement to the collected information of the same kind to determine an alignment factor for each particular capability being measured, and specifically calibrating at least one component of the augmented reality device with the alignment factor to produce measurements within a tolerance to the collected information. The calibrating, at 130 may also comprise adjusting motion detection sensitivity in the augmented reality device.

Persons skilled in the art will recognize that an apparatus, such as a data processing system, including a CPU, memory, I/O, program storage, a connecting bus, and other appropriate components, could be programmed or otherwise designed to facilitate the practice of embodiments of the method. Such a system may include appropriate program means for executing the method. Also, an article of manufacture, such as a pre-recorded disk, computer readable media, or other similar computer program product, for use with a data processing system, may include a storage medium and program means recorded thereon for directing the data processing system to facilitate the practice of the method.

Embodiments may also be described in the general context of computer-executable instructions, such as program modules, being executed by any device such as, but not limited to, a computer, designed to accept data, perform prescribed mathematical and/or logical operations usually at high speed, where results of such operations may or may not be displayed. Generally, program modules include routines, programs, objects, components, data structures, etc., that perform particular tasks or implement particular abstract data types. In an embodiment, the software programs that underlie embodiments can be coded in different programming languages, for use with different devices, or platforms. It will be appreciated, however, that the principles that underlie the embodiments can be implemented with other types of computer software technologies.

Moreover, those skilled in the art will appreciate that the embodiments may be practiced with other computer system configurations, multiprocessor systems, microprocessor-based or programmable consumer electronics, minicomputers, mainframe computers, and the like. Embodiments may also be practiced in distributed computing environments where tasks are performed by processing devices located at different locations on board of a vehicle or stationary device, that are linked through at least one communications network. In a distributed computing environment, program modules may be located in both local and remote computer storage media which may include memory storage devices.

In view of the above, a non-transitory processor readable storage medium is provided. The storage medium may comprise an executable computer program product which further comprises a computer software code that, when executed on a processor 24, causes the processor to initiate acquisition of information comprising a current location and/or orientation of an electronic calibration and/or location post, detect when an augmented reality device is attached to the post, and calibrate the augmented reality device to align a virtual environment with a real world environment of the augmented reality device with respect to the current location and/or orientation of the post.

Thus, based on the embodiments disclosed herein, users and manufacturers of HMDs may be provided with a portable infrastructure support system, namely the electronic post 10 described above, to allow for greater accuracy of real-world and virtual images viewable through the HMD 18 when the HMD 18 is used operationally, more specifically within a field of operation. The electronic post 10 may be portable enough to be mounted, either permanently or temporarily on a vehicle or inserted into the ground, or it may be permanently installed in a building or foundation intended to be used for many years. The electronic post 10 may be adapted to align multiple HMDs 18 (especially since even if a same brand each HMD 18 may have unique characteristics requiring its own calibration and/or alignment) while also integrating biometric information about respective users into the HMD to provide for tailored alignment specific to a particular user. Information residing in on the HMD 18 may also be downloaded and stored on the electronic post 10 for later retrieval, or for rapid, real-time, delivery to a remote location, and information on the post may be transmitted into the HMD. The electronic post 10 also provides for an alignment approach which may be automated.

The motor-driven translational and rotational calibration may be performed without the need to include them on a location post. They could be completely separate, in a separate facility.

While embodiments have been described with reference to various embodiments, it will be understood by those skilled in the art that various changes, omissions and/or additions may be made and equivalents may be substituted for elements thereof without departing from the spirit and scope of the embodiments. In addition, many modifications may be made to adapt a particular situation or material to the teachings of the embodiments without departing from the scope thereof. Therefore, it is intended that the embodiments not be limited to the particular embodiment disclosed as the best mode contemplated, but that all embodiments falling within the scope of the appended claims are considered. Moreover, unless specifically stated, any use of the terms first, second, etc., does not denote any order or importance, but rather the terms first, second, etc., are used to distinguish one element from another.

What is claimed is:

1. A calibration system comprising:
   a rotational attachment configured to removably secure an augmented reality device, the rotational attachment comprising a plurality of axis connectors, each axis connector corresponding to an axis of rotation of a plurality of axes of rotation; and
   a rotational motion unit configured to removably secure the rotational attachment at a first axis connector of the plurality of axis connectors and to rotate in a first direction the rotational attachment about a first axis of rotation of the plurality of axes of rotation corresponding to the first axis connector,
   a first processor configured to:
      determine, independently of the augmented reality device, a location of the calibration system in a real-world coordinate system; and
      control the rotational motion unit to rotate the rotational attachment about the first axis of rotation from a first predetermined orientation to a second predetermined orientation in the first direction at a predetermined rate of rotation;
   a first transceiver coupled to the first processor and configured to:
      receive, from the augmented reality device, a plurality of measurements comprising a measured location of the augmented reality device, a first measured orientation of the augmented reality device, a second measured orientation of the augmented reality device, and a first measured rate of rotation; and
      transmit, to the augmented reality device, calibration information based on the plurality of measurements.

2. The calibration system of claim 1, wherein the first processor is further configured to:
   compare a measurement of the plurality of measurements to one of the location of the calibration system in the real-world coordinate system, the first predetermined orientation, the second predetermined orientation, or the predetermined rate of rotation, to determine an alignment factor for the augmented reality device corresponding to the measurement; and
   generate the calibration information based on the alignment factor and a tolerance threshold.

3. The calibration system of claim 2, wherein the calibration information comprises at least one of motion detection sensitivity information or rotation detection sensitivity information for calibrating an inertial navigation system of the augmented reality device.

4. The calibration system of claim 1, further comprising the augmented reality device, the augmented reality device comprising:
   an inertial navigation system configured to calculate a current location and a current orientation of the augmented reality device;
   a transceiver configured to communicate with the first processor; and
   a second processor configured to:
      control the inertial navigation system to:
         measure a location of the augmented reality device;
         measure a first orientation of the augmented reality device;
         measure a second orientation of the augmented reality device; and
         measure a rate of rotation;
      control the transceiver to:
         transmit, to the first processor, a plurality of measurements comprising the location of the augmented reality device, the first orientation of the augmented reality device, the second orientation of the augmented reality device, and the rate of rotation; and
         receive, from the first processor, a calibration information based on the plurality of measurements; and update the inertial navigation system based on the calibration information.

5. The calibration system of claim 1, the calibration system further comprising:
a first transceiver coupled to the first processor and configured to communicate with the augmented reality device; and
a second transceiver coupled to the first processor and configured to communicate with a database at a remote location.

6. The calibration system of claim 5, the first processor further configured to:
control the second transceiver to receive from the remote location information specific to a user of the augmented reality device, and
control the first transceiver to transmit the information specific to the user to the augmented reality device.

7. The calibration system of claim 6, wherein the information specific to the user of the augmented reality device comprises at least one biometric characteristic unique to the user.

8. The calibration system of claim 5, wherein the first processor is further configured to receive from the remote location at least one of coordinates of a geocentric location of the calibration system, global positioning system (GPS) signals, and magnetic declination information to determine the location of the calibration system and the first predetermined orientation of the augmented reality device.

9. An augmented reality device comprising:
an inertial navigation system configured to calculate a current location and a current orientation of the augmented reality device;
a transceiver configured to communicate with a calibration system; and
a processor configured to:
control the inertial navigation system to:
measure a location of the augmented reality device;
measure a first orientation of the augmented reality device;
measure a second orientation of the augmented reality device; and
measure a rate of rotation;
control the transceiver to:
transmit, to the calibration system, a plurality of measurements comprising the location of the augmented reality device, the first orientation of the augmented reality device, the second orientation of the augmented reality device, and the rate of rotation; and
receive, from the calibration system, calibration information based on the plurality of measurements; and
update the inertial navigation system based on the calibration information.

10. The augmented reality device of claim 9, wherein the calibration information comprises at least one of motion detection sensitivity information or rotation detection sensitivity information for calibrating the inertial navigation system, the processor further configured to update the inertial navigation system based on the motion detection sensitivity information or the rotation detection sensitivity information.

11. The augmented reality device of claim 9, the processor further configured to align a virtual location and a virtual orientation in a parallel virtual environment of the augmented reality device with a real-world environment based on the update of the inertial navigation system.

12. The augmented reality device of claim 9, wherein:
the transceiver is further configured to receive from the calibration system information specific to a user of the augmented reality device; and
the processor is further configured to adjust the augmented reality device based on the information specific to the user.

13. The augmented reality device of claim 12, further comprising a frame configured to be wearable by the user as a head-mounted device, wherein to adjust the augmented reality device the processor is further configured to adjust the frame of the augmented reality device to align a geometry of the augmented reality device with a head of the user based on the information specific to the user.

14. The augmented reality device of claim 12, further comprising:
a frame configured to be wearable by the user as a head-mounted device;
a plurality of vision components, coupled to the frame, configured to provide images to the user;
wherein the information specific to the user of the augmented reality device comprises an inter-pupillary distance of eyes of the user; and
wherein to adjust the augmented reality device the processor is further configured to adjust a vision component of the plurality of vision components based on the inter-pupillary distance of the eyes of the user.

15. A method for calibrating an augmented reality device, comprising:
rotating, by a rotational motion unit of a calibration system, a rotational attachment in a first direction about an axis of rotation of a plurality of axes of rotation, the rotational attachment securing the augmented reality device;
determining, by a processor of the calibration system, independently of the augmented reality device, a location of the calibration system in a real-world coordinate system;
controlling, by the processor, the rotational motion unit to rotate the rotational attachment about the axis of rotation from a first predetermined orientation to a second predetermined orientation in the first direction at a predetermined rate of rotation;
receiving, by a transceiver of the calibration system from the augmented reality device, a plurality of measurements comprising a measured location of the augmented reality device, a first measured orientation of the augmented reality device, a second measured orientation of the augmented reality device, and a measured rate of rotation;
comparing a measurement of the plurality of measurements to one of the location of the calibration system in the real-world coordinate system, the first predetermined orientation, the second predetermined orientation, or the predetermined rate of rotation, to determine an alignment factor for the augmented reality device corresponding to the measurement;
generating the calibration information based on the alignment factor and a tolerance threshold; and
transmitting, to the augmented reality device, the calibration information.

16. The method of claim 15, further comprising:
receiving, by the transceiver of the calibration system from a remote location, at least one biometric characteristic unique to a user of the augmented reality device; and transmitting, to the augmented reality device, the at least one biometric characteristic unique to the user.

\* \* \* \* \*